(12) United States Patent
Nozaki et al.

(10) Patent No.: US 7,300,383 B2
(45) Date of Patent: Nov. 27, 2007

(54) HYDRAULIC CONTROL DEVICE FOR VEHICULAR AUTOMATIC TRANSMISSION

(75) Inventors: Kazutoshi Nozaki, Nisshin (JP); Masami Kondo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 197 days.

(21) Appl. No.: 11/123,064

(22) Filed: May 6, 2005

(65) Prior Publication Data

US 2005/0247153 A1    Nov. 10, 2005

(30) Foreign Application Priority Data

May 7, 2004    (JP)    ............................. 2004-139150

(51) Int. Cl.
*F16H 61/26*    (2006.01)
(52) U.S. Cl. ..................................................... 477/131
(58) Field of Classification Search ................ 475/123, 475/116; 477/131, 138, 155, 98
See application file for complete search history.

(56) References Cited

U.S. PATENT DOCUMENTS 6,659,899 B2    12/2003    Naunheimer

FOREIGN PATENT DOCUMENTS

| DE | 101 28 805 A1 | 1/2003 |
|---|---|---|
| JP | 2001-248718 | 9/2001 |

*Primary Examiner*—Dirk Wright
(74) *Attorney, Agent, or Firm*—Oblon, Spivak, McClelland, Maier & Neustadt, P.C.

(57) ABSTRACT

A hydraulic control apparatus for controlling a vehicular automatic transmission including hydraulically operated frictional coupling devices which are selectively engaged and released to selectively establish gear positions having respective different speed ratios, and linear solenoid valves operable to regulate fluid pressures of the respective frictional coupling devices, each linear solenoid valve including a spool and a solenoid and being operable between a pressure-regulating state in which the spool is movable to a position of equilibrium of forces for regulating an output fluid pressure according to an electromagnetic force produced by the solenoid, and a non-pressure-regulating state in which the spool is held at a stroke end thereof at which no output fluid pressure is generated from the linear solenoid valve, each linear solenoid valve in the pressure-regulating state being operable to regulate a fluid pressure of the corresponding frictional coupling device according to the electromagnetic force, the hydraulic control apparatus including a pressure-regulation switching portion operable to effect a determination on the basis of a present state of a vehicle provided with the automatic transmission, as to whether each non-used linear solenoid valve, which is one of the linear solenoid valves that is not presently used to engage the corresponding frictional coupling device, should be placed in the pressure-regulating state or in the non-pressure-regulating state, the pressure-regulation switching portion placing each non-used linear solenoid valve selectively in the pressure-regulating or non-pressure-regulating states, according to a result of the determination.

9 Claims, 11 Drawing Sheets

|  | C1 | C2 | C3 | C4 | B1 | B2 | F1 |
|---|---|---|---|---|---|---|---|
| P |  |  |  |  |  |  |  |
| Rev1 |  |  | O |  |  | O |  |
| Rev2 |  |  |  | O |  | O |  |
| N |  |  |  |  |  |  |  |
| 1st | O |  |  |  |  | (O) | O |
| 2nd | O |  |  |  | O |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  | O |  |  |

|      | C1 | C2 | C3 | C4 | B1 | B2 | F1 |
|------|----|----|----|----|----|----|----|
| P    |    |    |    |    |    |    |    |
| Rev1 |    |    | O  |    |    | O  |    |
| Rev2 |    |    |    | O  |    | O  |    |
| N    |    |    |    |    |    |    |    |
| 1st  | O  |    |    |    |    | (O)| O  |
| 2nd  | O  |    |    |    | O  |    |    |
| 3rd  | O  |    | O  |    |    |    |    |
| 4th  | O  |    |    | O  |    |    |    |
| 5th  | O  | O  |    |    |    |    |    |
| 6th  |    | O  |    | O  |    |    |    |
| 7th  |    | O  | O  |    |    |    |    |
| 8th  |    | O  |    |    | O  |    |    |

| SHIFT RANGE | GEAR POSITIONS AVAILABLE |
|---|---|
| D | 1,2,3,4,5,6,7,8 |
| 7 | 1,2,3,4,5,6,7 |
| 6 | 1,2,3,4,5,6 |
| 5 | 1,2,3,4,5 |
| 4 | 1,2,3,4 |
| 3 | 1,2,3 |
| 2 | 1,2 |
| L | 1 |

SHIFT-UP ↑
↓ SHIFT-DOWN

HYDRAULIC CONTROL DEVICE FOR VEHICULAR AUTOMATIC TRANSMISSION

This application is based on Japanese Patent Application No. 2004-139150 filed May 7, 2004, the contents of which are incorporated hereinto by reference.

BACKGROUND OF THE INVENTION

1. Field of the Invention

The present invention relates in general to a hydraulic control apparatus for a vehicular automatic transmission, and more particularly to techniques associated with pressure regulation of non-used ones of linear solenoid valves provided for hydraulically operated frictional coupling devices of the automatic transmission.

2. Discussion of Related Art

JP-2001-248718A discloses an example of a hydraulic control apparatus for a vehicular automatic transmission including (a) a plurality of hydraulically operated frictional coupling devices which are selectively engaged and released to selectively establish a plurality of gear positions having respective different speed ratios, and (b) a plurality of linear solenoid valves operable to regulate fluid pressures of the respective hydraulically operated frictional coupling devices. The hydraulic control apparatus disclosed in the above-identified publication is adapted to control a vehicular automatic transmission of a planetary gear type.

Each of the linear solenoid valves indicated above includes a spool and a solenoid, and is operable between a pressure-regulating state in which the spool is moved to a position of equilibrium of forces for regulating an output fluid pressure according to an electromagnetic force produced by a solenoid, and a non-pressure-regulating state in which the spool is held at its stroke end at which no output fluid pressure is generated from the valve. The linear solenoid valve placed in the pressure-regulating state is operable to regulate the fluid pressure of the corresponding hydraulically operated frictional coupling device according to the electromagnetic force of the solenoid, when this frictional coupling device is engaged to establish a presently selected gear position of the automatic transmission. However, each non-used linear solenoid valve for the frictional coupling device not to be engaged to establish the currently selected gear position of the automatic transmission is usually placed in either the non-pressure-regulating state or a lowest-pressure-regulating state, irrespective of a present state of a vehicle provided with the automatic transmission. Namely, the non-used linear solenoid valve is always placed in the non-pressure-regulating state or the lowest-pressure-regulating state, irrespective of the present vehicle state. In the lowest-pressure-regulating state, the output fluid pressure is regulated to the lowest level. The non-used linear solenoid valve can be placed in the non-pressure-regulating state, by de-energizing the solenoid where the valve is of a normally-closed type, or by maximizing an electric current applied to the solenoid where the valve is of a normally-open type. The non-used linear solenoid valve can be placed in the lowest-pressure-regulating state, by minimizing the electric current of the solenoid where the valve is of the normally-closed type, or by maximizing the electric current of the solenoid where the valve is of the normally-open type, within a range of the electric current of the solenoid in which the spool is movable to a position of equilibrium of forces.

When the linear solenoid valve is switched from the non-pressure-regulating state to the pressure-regulating state by application of the electric current to the solenoid to regulate the fluid pressure of the corresponding frictional coupling device for establishing the currently selected gear position of the automatic transmission, however, it takes a considerably long time for the spool to be moved to the position of equilibrium of forces, giving rise to a risk of deterioration of a hydraulic shifting response of the automatic transmission due to a slow rise of the fluid pressure of the frictional coupling device. Where the linear solenoid valve is placed in the lowest-pressure-regulating state, the spool is held at the position of equilibrium of forces, permitting a higher hydraulic shifting response of the automatic transmission. In this lowest-pressure-regulating state, however, a pressurized working fluid always flows through the linear solenoid valve, requiring a relatively large amount of delivery of the working fluid from an oil pump, thereby requiring the oil pump to have a relatively large capacity and resulting in a relatively large load on a drive source provided to drive the oil pump, leading to deterioration of energy efficiency of the vehicle due to an increased amount of consumption of a fuel by a vehicle engine functioning as the drive source, for example. Although the pressurized working fluid should be supplied to the linear solenoid valve to hold the valve in its pressure-regulating state in which the spool is held at the position of equilibrium of forces for generating the desired output fluid pressure, the pressurized fluid need not be supplied to the linear solenoid valve placed in the non-pressure-regulating state in which no output fluid pressure is generated.

SUMMARY OF THE INVENTION

It is therefore an object of the present invention to provide a hydraulic control apparatus capable of controlling non-used linear solenoid valves of a vehicular automatic transmission, while preventing deterioration of a hydraulic shifting response of the automatic transmission and minimizing the required delivery of the pressurized working fluid to the linear solenoid valves, for thereby improving the energy efficiency such as the fuel economy of the vehicle.

The above object may be achieved according to any one of the following modes of this invention, each of which is numbered like the appended claims and depends from the other mode or modes, to indicate and clarify possible combinations of elements or technical features. It is to be understood that the present invention is not limited to the technical features or any combinations thereof which will be described for illustrative purpose only. It is to be understood that a plurality of elements or features included in any one of the following modes of the invention are not necessarily provided all together, and that the invention may be embodied without some of the elements or features described with respect to the same mode.

(1) A hydraulic control apparatus for controlling a vehicular automatic transmission including (a) a plurality of hydraulically operated frictional coupling devices which are selectively engaged and released to selectively establish a plurality of gear positions having respective different speed ratios, and (b) a plurality of linear solenoid valves operable to regulate fluid pressures of the respective frictional coupling devices, each of the linear solenoid valves including a spool and a solenoid, and being operable between a pressure-regulating state in which the spool is movable to a position of equilibrium of forces for regulating an output fluid pressure according to an electromagnetic force produced by the solenoid, and a non-pressure-regulating state in which the spool is held at a stroke end thereof at which no output fluid pressure is generated from the linear solenoid valve, each linear solenoid valve placed in the pressure-regulating state being operable to regulate a fluid pressure of the corresponding frictional coupling device according to the electromagnetic force, the hydraulic control apparatus comprising:

a pressure-regulation switching portion operable to effect a determination on the basis of a present state of a vehicle provided with the automatic transmission, as to whether each non-used linear solenoid valve, which is one of the plurality of linear solenoid valves that is not presently used to engage the corresponding hydraulically operated frictional coupling device, should be placed in the pressure-regulating state or in the non-pressure-regulating state, the pressure-regulation switching portion placing each non-used linear solenoid valve selectively in one of the pressure-regulating and non-pressure-regulating states, according to a result of the determination.

In the hydraulic control apparatus according to the above mode (1) of the present invention, the pressure-regulation switching portion is arranged to effect the determination on the basis of the present vehicle state as to whether each non-used linear solenoid valve which is not presently used to engage the corresponding hydraulically operated frictional coupling device should be placed in the pressure-regulating state or in the non-pressure-regulating state, and is further arranged to place the non-used linear solenoid valve selectively in one of the pressure-regulating state and non-pressure-regulating state, according to a result of the determination. Since some of the non-used linear solenoid valves are placed in the non-pressure-regulating state, the required delivery of the pressurized fluid from a hydraulic pressure source such as an oil pump can be reduced, and the required capacity of the hydraulic pressure source can be reduced, so that the load acting on a drive power source (e.g., an engine) for driving the hydraulic pressure source can be reduced, whereby the energy efficiency such as fuel economy of the vehicle can be improved. In addition, some of the non-used linear solenoid valves are placed in the pressure-regulating state, so that the hydraulic shifting response of the automatic transmission can be improved.

(2) The hydraulic control apparatus according to the above-described mode (1), wherein the pressure-regulation switching portion includes a fluid-temperature-based switching portion operable to place each non-used linear solenoid valve in the pressure-regulating state when a temperature of a working fluid used for operating the automatic transmission is lower than a predetermined threshold, and in the non-pressure-regulating state when the temperature is not lower than the predetermined threshold.

In the hydraulic control apparatus according to the above-described mode (2) of the invention, the fluid-temperature-based switching portion is arranged to place each non-used linear solenoid valve in the pressure-regulating state when the temperature of the working fluid used for the automatic transmission is lower than the predetermined threshold, that is, when the working fluid has a relatively high degree of viscosity. This arrangement is effective to prevent deterioration of the hydraulic shifting response of the automatic transmission when the viscosity of the working fluid is relatively high. When the working fluid temperature is not lower than the threshold, that is, when the working fluid has a relatively low degree of viscosity, the linear solenoid valves tend to have a relatively large amount of leakage flow, and a relatively high rate of fluid flow therethrough if placed in the pressure-regulating state. To reduce the required delivery of the pressurized fluid to each non-used linear solenoid valve, therefore, the fluid-temperature-based switching portion is arranged to place the non-used linear solenoid valve in the non-pressure-regulating state, so that the energy efficiency of the vehicle can be improved.

(3) The hydraulic control apparatus according to the above-described mode (1) or (2), wherein the pressure-regulation switching portion includes a manual-shifting-based switching portion operable to place each linear solenoid valve in the pressure-regulating state when the automatic transmission is placed in manual shifting mode in which the automatic transmission is shiftable by an operation of a manually operable member, and in the non-pressure regulating state when the automatic transmission is placed in an automatic shifting mode in which the automatic transmission is shifted automatically on the basis of a running condition of the vehicle and according to a predetermined shifting rule.

In the hydraulic control apparatus according to the above-described mode (3) of the invention, the manual-shifting-based switching portion is arranged to place each non-used linear solenoid valve in the pressure-regulating state when the automatic transmission is placed in the manual shifting mode. Accordingly, the hydraulic shifting response of the automatic transmission is improved when the automatic transmission is placed in the manual shifting mode in which the manually operable member such as a shift lever is operated by the vehicle operator for the purpose of manually shifting up or down the automatic transmission. In the automatic shifting mode, on the other hand, the manual-shifting-based switching portion places each non-used linear solenoid valve in the non-pressure-regulating state, so that the required delivery of the pressurized working fluid to the non-used linear solenoid valve can be reduced, whereby the energy efficiency of the vehicle can be improved.

In the manual shifting mode indicated above, the automatic transmission may be shifted up or down directly by an operation of a shift lever, or indirectly as a result of manual selection of one of a plurality of shift ranges, which causes an automatic shifting action of the automatic transmission on the basis of a running condition of the vehicle and according to a predetermined shifting rule. In the latter case, the number of forward-drive gear positions of the automatic transmission available for automatic shifting can be changed by changing a selected one of the shift ranges, so that a change of the shift range from one range to another by an operation of a manually operable member may cause an automatic shifting of the automatic transmission. For example, the shift ranges are determined such that the shift ranges has respective different consecutive numbers of the forward-drive gear positions available for automatic shifting. In this case, when the shift range is manually changed from one shift range to another so as to reduce by one the number of the forward-drive gear positions available, during running of the vehicle with the automatic transmission placed in the highest gear position of the above-indicated one shift range, the automatic transmission may be automatically shifted down.

(4) The hydraulic control apparatus according to any one of the above modes (1)–(3), wherein the pressure-regulation switching portion includes a shifting-forecasting-based switching portion operable to normally place each linear solenoid valve in the non-pressure-regulating state, and place each non-used linear solenoid valve in the pressure-regulating state when the shifting-forecasting-based switching portion has forecast that an engaging action of the above-indicated corresponding hydraulically operated frictional coupling device will take place in the near future.

In the hydraulic control apparatus according to the above-indicated mode (4), the shifting-forecasting-based switching portion is arranged to normally place each non-used linear solenoid valve in the non-pressure-regulating state, so that the required delivery of the pressurized working fluid to the non-used linear solenoid valve can be reduced, whereby the energy efficiency of the vehicle can be improved. In the event of forecasting of a future engaging action of the frictional coupling device corresponding to the non-used linear solenoid valve, the shifting-forecasting-based switching portion places the non-used linear solenoid valve in the pressure-regulating state, prior to an operation of the pressure-regulation switching portion to normally control the output fluid pressure of the non-used linear solenoid valve for effecting the engaging action of the corresponding frictional coupling device. Accordingly, the hydraulic shifting response of the automatic transmission upon a shifting action by the engaging action of the frictional coupling device in question can be improved.

(5) The hydraulic control apparatus according to any one of the above-described modes (1)–(4), further comprising a shift control portion including a shifting determining portion operable to determine whether a shifting action of the automatic transmission should take place, and a shifting commanding portion operable to command at least one of the plurality of linear solenoid valves to initiate regulation of the output fluid pressure for engaging the corresponding at least one frictional coupling device to effect the shifting action of the automatic transmission, at a predetermining timing after a moment of determination by the shifting determining portion that the shifting action should take place, and wherein the pressure-regulation switching portion includes a shifting-determination-based switching portion operable to normally place each linear solenoid valve in the non-pressure-regulating state, and place each non-used linear solenoid valve for each of the above-indicated corresponding at least one frictional coupling device in pressure-regulating state when the shifting determining portion has determined that the shifting action should take place, the shifting-determination-based switching portion placing the non-used linear solenoid valve in the pressure-regulating state prior to initiation of regulation of the output fluid pressure by each non-used linear solenoid valve under the control of the shifting commanding portion.

In the hydraulic control apparatus according to the above-indicated mode (5), the shifting-determination-based switching portion is arranged to normally place each non-used linear solenoid valve in the non-pressure-regulating state, so that the required delivery of the pressurized working fluid to the non-used linear solenoid valve can be reduced, whereby the energy efficiency of the vehicle can be improved. In the event of determination of a shifting action of the automatic transmission by the shifting determining portion, the shifting-determination-based switching portion places the non-used linear solenoid valve for each frictional coupling device to be engaged to effect the shifting action, in the pressure-regulating state, prior to initiation of regulation of the output fluid pressure by each non-used linear solenoid valve under the control of the shifting commanding portion. Accordingly, the hydraulic shifting response of the automatic transmission upon a shifting action by the engaging action of the at least one frictional coupling device in question can be improved.

(6) The hydraulic control apparatus according to any one of the above-described modes (1)–(6), wherein the automatic transmission has a neutral state for inhibiting power transmission therethrough, and a drive state for permitting the power transmission, and the pressure-regulation switching portion includes a neutral-state-based switching portion operable when the automatic transmission is placed in the neutral position, to place each first non-used linear solenoid valve for each of at least one of the plurality of frictional coupling devices that is to be engaged when the automatic transmission is switched from the neutral state to the drive state, in the pressure-regulating state, and place each second non-used linear solenoid valve other than each first non-used linear solenoid valve, in the non-pressure-regulating state.

In the hydraulic control apparatus according to the above-described mode (6), the neutral-state-based switching portion is operated when the automatic transmission is placed in the neutral state, to place each first non-used linear solenoid valve for each frictional coupling device to be engaged upon switching of the automatic transmission from the neutral state to the drive state, in the pressure-regulating state. Accordingly, the hydraulic shifting response of the automatic transmission upon a shifting action thereof to a forward-drive gear position or a reverse-drive gear position can be improved. The neutral-state-based switching portion is further arranged to place each second non-used linear solenoid valve other than the first non-used linear solenoid valve or valves in the non-pressure-regulating state, so that the required delivery of the pressurized working fluid to the other non-used linear solenoid valve or valves can be reduced, and the energy efficiency of the vehicle can be improved.

(7) The hydraulic control apparatus according to any one of the above-described modes (1)–(6), wherein the electromagnetic force "F" produced by the solenoid acts on the spool in a first direction, and the spool has a pressure-receiving surface area "Af" partially defining a feedback chamber that receives a feedback pressure "Pf" which is equal to the output fluid pressure and which acts on the spool in a second direction opposite to the first direction, each linear solenoid valve further including a spring which biases the spool in the second direction with a biasing force "Fs", the spool being movable to a position of equilibrium of forces determined according to an equation (1) F=Pf×Af+Fs, in the pressure-regulating state.

In the pressure-regulating state, the spool of each linear solenoid valve is held at the position of equilibrium forces at which the above-indicated equation (1) is satisfied. In the non-pressure-regulating state, the spool is held at its stroke end at which the above-indicated equation(1) is not satisfied and no output fluid pressure is generated from the linear solenoid valve. Where the linear solenoid valve is of a normally-closed type, the spool of the linear solenoid valve placed in its non-pressure-regulating state is held at its stroke end on the side of the solenoid under the biasing force Fs of the spring, with the electromagnetic force F being zero. Where the valve is of a normally-open type, the spool of the valve in its non-pressurizing state is held at its stroke end on the side of the spring, with the maximum electromagnetic force F, against the biasing force Fs of the spring.

(8) The hydraulic pressure control apparatus according to any one of the above-described modes (1)–(7), wherein the pressure-regulating state to which each non-used linear solenoid valve is switched by the pressure-regulation switching portion is a lowest-pressure-regulating state in which the output fluid pressure is regulated to a substantially lowest level within a range in which the spool is movable to the position of equilibrium of forces.

The lowest-pressure-regulating state is desirable for minimizing the required delivery of the pressurized working fluid from the hydraulic pressure source. However, the pressure-regulating state may be a state in which the output fluid pressure is not higher than a level above which the degree of engagement of the corresponding frictional coupling device is sufficient for the frictional coupling device to transmit a torque. The lowest-pressure-regulating state can be established by minimizing the electric current of the solenoid where the valve is of the normally-closed type, or by maximizing the electric current of the solenoid where the valve is of the normally-open type, within a range of the electric current of the solenoid in which the spool is movable to the position of equilibrium of forces. As long as the required delivery of the pressurized fluid can be reduced or minimized, the electric current to be applied to the solenoid to establish the lowest-pressure-regulating state may be suitably determined so as to be outside a range in which the electric current is normally controlled for each linear solenoid valve for the frictional coupling device to be engaged. The output fluid pressure generated in the pressure-regulating state which is preferably the lowest-pressure-regulating state may be detected by a hydraulic pressure switch, to control the electric current to be applied to the solenoid.

(9) The hydraulic control apparatus according to any one of the above-described modes (1)–(8), wherein the pressure-regulation switching portion includes a fluid-temperature-based switching portion defined in claim 2, a manual-shifting-based switching portion defined in claim 3, a shifting-forecasting-based switching portion defined in claim 4, a shifting-determination-based switching portion defined in claim 5, and a neutral-state-based switching portion defined in claim 6, the pressure-regulation switching portion placing each non-used linear solenoid valve when any one of the fluid-temperature-based switching portion, the manual-shifting-based switching portion, the shifting-forecasting-based switching portion, the shifting-determination-based switching portion and the neutral-state-based switching portion has determined that each non-used linear solenoid valve should be placed in the pressure-regulating state, even if any other of the fluid-temperature-based, manual-shifting-based, shifting-forecasting-based, shifting-determination-based and neutral-state-based switching portions has determined that said each non-used linear solenoid valve should be placed in said non-pressure-regulating state.

While the fluid-temperature-based switching portion according to the mode (2), manual-shifting-based switching portion according to the mode (3), shifting-forecasting-based switching portion according to the mode (4), shifting-determination-based switching portion according to the mode (5) and neutral-state-based switching portion according to the mode (6) have been described above for illustrative purpose only, it is to be understood that the pressure-regulation switching portion may include any other switching portion arranged to selectively place each non-used linear solenoid valve not presently used to engage the corresponding frictional coupling device, in one of the pressure-regulating and non-pressure-regulating states, on the basis of any other detected state of the vehicle.

The hydraulic control apparatus according to the present invention is preferably applicable to an automatic transmission of a planetary-gear type having a plurality of planetary gear sets. However, the principle of the present invention is equally applicable to automatic transmissions of any other types including a plurality of hydraulically operated frictional coupling devices selectively engaged and released to effect shifting actions, such as a parallel two-axes type automatic transmission having a plurality of power input paths which are selectively connected to an output rotary member.

Each of the hydraulically operated frictional coupling devices of the automatic transmission may be a multiple-disc or single-disc type clutch or brake, or a belt type brake, which is engaged by a hydraulic actuator and commonly used for an automatic transmission. An oil pump provided to deliver a pressurized working fluid for engaging the frictional coupling device may be driven by a vehicle drive source such as an engine, or an electric motor exclusively provided to drive the oil pump.

The pressure-regulating state established by the pressure-regulation switching portion need not be a fixed state such as the above-described lowest-pressure-regulating state, and may be changed depending upon the presently detected state of the vehicle. For instance, when the pressure-regulation switching portion has detected or forecasted a high possibility that an engaging action of a frictional coupling device will take place to effect a shifting action of the automatic transmission in the near future, the corresponding linear solenoid valve not presently used to engage the frictional coupling device in question may be placed in a pressure-regulating state in which the output fluid pressure is only slightly lower than a level at which the frictional coupling device begins to transmit a torque to the output rotary member.

A hydraulic control device including the hydraulically operated frictional coupling devices and the corresponding linear solenoid valves may be preferably arranged to apply the output fluid pressure of each linear solenoid valve directly to a hydraulic actuator (hydraulic cylinder) for engaging the corresponding frictional coupling device, for improving the hydraulic shifting response of the automatic transmission. However, a suitable control valve may be provided between each linear solenoid valve and the corresponding hydraulic actuator, so that the output fluid pressure of the linear solenoid valve is controlled by the control valve, and the thus controlled fluid pressure is applied to the hydraulic actuator.

The linear solenoid valves are usually provided for the respective hydraulically operated frictional coupling devices. Where the frictional coupling devices include two or more frictional coupling devices that are not simultaneously engaged or released, a single common linear solenoid valve may be provided for these frictional coupling devices. Further, not all of the frictional coupling devices need not be controlled by linear solenoid valves, and some of the frictional coupling devices may be controlled by solenoid-operated shut-off valves which are alternately opened and closed with their solenoids being alternately turned on and off with a controlled duty ratio. However, the principle of the present invention is applicable to an automatic transmission wherein at least one of the frictional coupling devices is controlled by a linear solenoid valve having a solenoid the electromagnetic force of which is linear controllable to linearly control the electromagnetic force.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENTS

Figures 1A, 1B:
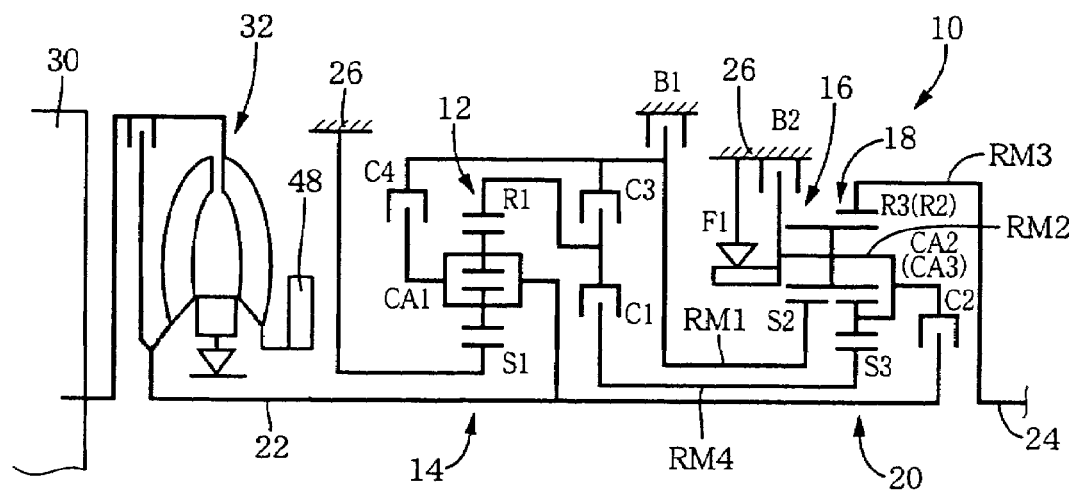
FIG. 1A is a schematic view illustrating a vehicular automatic transmission controlled by a hydraulic control apparatus constructed according to one embodiment of the present invention.
FIG. 1B is a table indicating a relationship between gear positions of the automatic transmission of FIG. 1A and combinations of operating states of hydraulically operated frictional coupling devices to establish the respective gear positions.

Referring to first to the schematic view of FIG. 1A, there is illustrated a basic arrangement of a vehicle automatic transmission 10, which is suitably used installed on a front-engine rear-drive vehicle (FR vehicle) such that the axial direction of the automatic transmission 10 is parallel to the longitudinal or running direction of the vehicle. As shown in FIG. 1A, the automatic transmission 10 includes a first transmission portion 14 constituted principally by a first planetary gear set 12 of a double-pinion type, and a second transmission portion 20 constituted principally by a second planetary gear set 16 of a single-pinion type and a third planetary gear set 18 of a double-pinion type. The first transmission portion 14 and the second transmission portion 20 are disposed coaxially with each other and are connected to an input shaft 14, and the second transmission portion 20 is connected to an output shaft 24, so that the speed of a rotary motion of the input shaft 22 is changed by the first and second transmission portions 14, 20, into the speed of a rotary motion of the output shaft 24. The input shaft 22, which is an input member of the automatic transmission 10, is a turbine shaft of a torque converter 32 rotated by a drive power source of the vehicle in the form of an engine 30, while the output shaft 24 is an output member of the automatic transmission 10, which is operatively connected to right and left drive wheels of the vehicle through a propeller shaft and a differential gear device. Since the automatic transmission 10 is constructed symmetrically with respect to its axis, the lower half of the automatic transmission 10 located below the axis is omitted in the schematic view of FIG. 1A.

The first planetary gear set 12 of the first transmission portion 14 has three rotary elements in the form of a sun gear S1, a carrier CA1 and a ring gear R1. The sun gear S1 is fixed to a transmission casing 26 such that the sun gear S1 is not rotatable relative to the transmission casing 26. The carrier CA1 is integrally fixed to the input shaft 22 and rotated with the input shaft 22, so that the speed of the ring gear R1 functioning as a decelerating output member is reduced with respect to the speed of the input shaft 22. The second and third planetary gear sets 16, 18 of the second transmission portion 20 have rotary elements some of which are fixed to each other to provide four rotary elements RM1–RM4. Described in detail, the second planetary gear set 16 has a sun gear S2 functioning as a first rotary element RM 1, and a carrier CA2 which is fixed to a carrier CA3 of the third planetary gear set 18 and cooperates with this carrier CA3 to constitute a second rotary element RM2. The second planetary gear set 16 further has a ring gear R2 which is fixed to a ring gear R3 of the third planetary gear set 18 and cooperates with this ring gear R3 to constitute a third rotary element RM3. The third planetary gear set 18 further has a sun gear S3 functioning as a fourth rotary element RM4. The second and third planetary gear sets 16, 18 use a single member functioning as the carrier CA2 and the carrier CA3, and another single member functioning as the ring gear R2 and the ring gear R3, and cooperate to constitute a Ravigneaux type planetary gear train wherein a pinion gear of the second planetary gear set 16 also functions as one of two pinion gears, that is, a second pinion gear.

The first rotary element RM1 (sun gear S2) is selectively fixed through a first brake B1 to the transmission casing 26, and the second rotary element RM2 (carriers CA2 and CA3) is selectively fixed through a second brake B2 to the transmission casing 26. The fourth rotary element RM4 (sun gear S3) is selectively connected through a first clutch C1 to the decelerating member in the form of the ring gear R1 of the first planetary gear set 12, and the second rotary element RM2 (carriers CA2, CA3) is selectively connected through a second clutch C2 to the input shaft 22. The first rotary element RM1 (Sun gear S2) is selectively connected through a third clutch C3 to the decelerating member in the form of the ring gear R1, and selectively connected through a fourth clutch C3 to the carrier CA1 of the first planetary gear set 12, that is, to the input shaft 22. The third rotary element RM3 (ring gears R2 and R3) are integrally fixed to the output shaft 24, for providing an output rotary motion. Between the second rotary element RM2 (carriers CA2, CA3) and the transmission casing 26, there is disposed a one-way clutch F1 in parallel with the second brake B2. This one-way clutch F1 permits a rotary motion of the second rotary element RM2 in the forward direction (in the direction of rotation of the input shaft 22), but inhibits a rotary motion of the second rotary element RM2 in the reverse direction.

Figure 2:
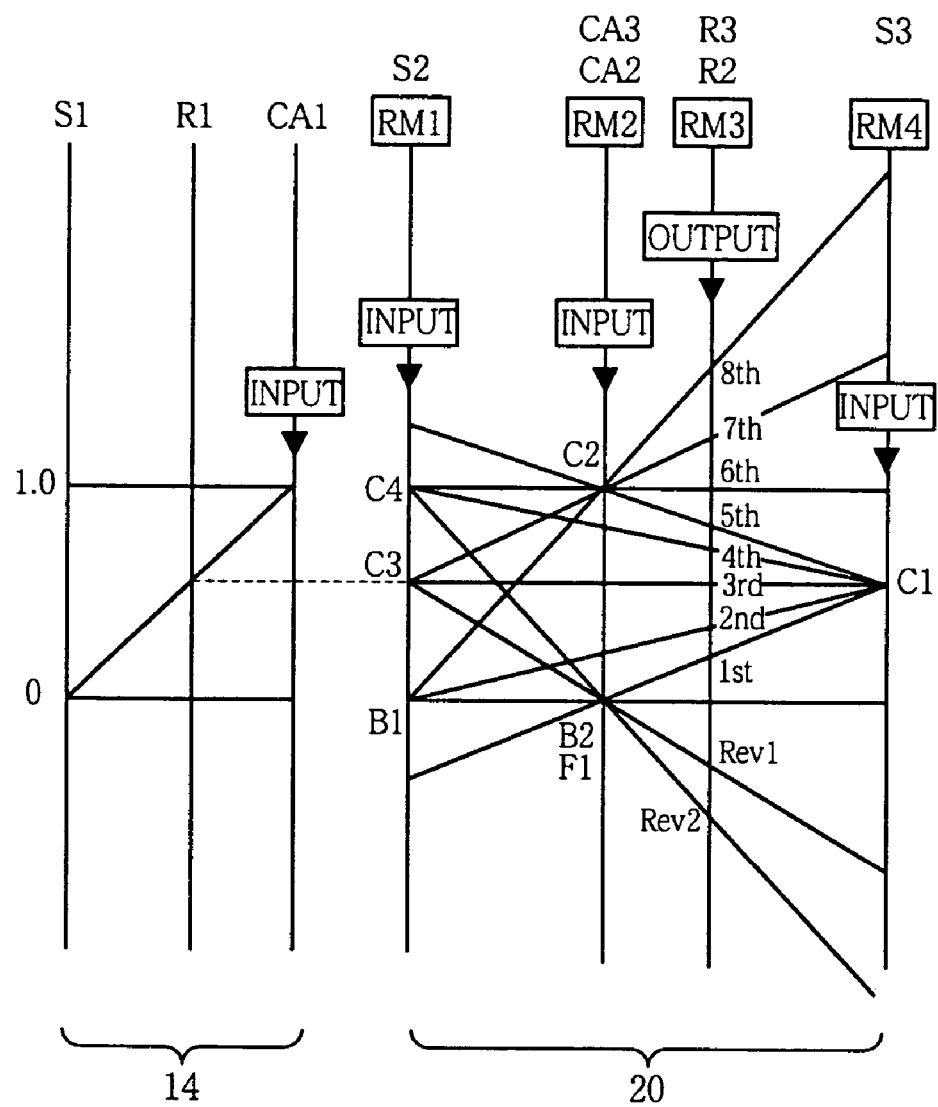
FIG. 2 is a collinear chart indicating by straight lines relative rotating speeds of a plurality of rotary elements of the vehicular automatic transmission of FIG. 1A placed in each gear position.

The collinear chart of FIG. 2 indicates, by straight lines, the rotating speed of each element of the first and second transmission portions 14, 20 in each of the gear positions of the automatic transmission 10. The collinear chart has a lower horizontal straight line indicating the speed "0", and an upper horizontal straight line indicating the speed "1.0", namely, the rotating speed of the input shaft 22. The collinear chart further has three vertical straight lines corresponding to the first transmission portion 14, and four vertical straight lines corresponding to the second transmission portion 20. The three vertical straight lines corresponding to the first transmission portion 14 respectively represent the sun gear S1, ring gear R1 and carrier CA1, in the order from the left side toward the right side. The distances between the adjacent ones of the those three vertical lines are determined by a gear ratio ρ1 of the first planetary gear set 12, which is a ratio of the number of teeth of the sun gear S1 to the number of teeth of the ring gear R1. The four vertical straight lines corresponding to the second transmission portion 20 respectively represent the first rotary element RM1 (sun gear S2), the second rotary element RM2 (carriers CA2, CA3), the third rotary element RM3 (ring gears R2, R3) and the fourth rotary element (sun gear S3), in the order from the left side toward the right side. The distances between the adjacent ones of those four vertical lines are determined by a gear ratio ρ2 of the second planetary gear set 16 and a gear ratio ρ3 of the third planetary gear set 18.

As indicated in FIG. 1B, the automatic transmission 10 is placed in a first gear position "1st" when the first clutch C1 and the second brake B2 are engaged. The first gear position "1st" has a highest speed ratio (a ratio of a rotating speed $N_{IN}$ of the input shaft 22 to a rotating speed $N_{OUT}$ of the output shaft 24). In this first gear position, the fourth rotary element RM4 and the decelerating output member in the form of the ring gear R1 are rotated together at a reduced speed, while the second rotary element RM2 is held stationary, so that the output shaft 24 connected to the third rotary element RM3 is rotated at a speed represented by an inclined straight line labeled "1st" in the collinear chart of FIG. 2. When the first clutch C1 and the first brake B1 are engaged, the automatic transmission 10 is placed in a second gear position "2nd" having a speed ratio lower than that of the first gear position "1st". In the second gear position "2nd", the fourth rotary element RM4 and the ring gear R1 are rotated together at a reduced speed, while the first rotary element RM1 is held stationary, so that the third rotary element RM3 is rotated at a speed represented by an inclined straight line labeled "2nd" in the collinear chart. When the first clutch C1 and the third clutch C3 are engaged, the automatic transmission 10 is placed in a third gear position "3rd" having a speed ratio lower than that of the second gear position "2nd". In the third gear position "3rd", the second transmission portion 20 and the ring gear R1 are rotated together at a reduced speed, so that the third rotary element RM3 is rotated at a speed represented by a horizontal straight line labeled "3rd" in the collinear chart, that is, at the same speed as the ring gear R1. When the first clutch C1 and the fourth clutch C4 are engaged, the automatic transmission 10 is placed in a fourth gear position "4th" having a speed ratio lower than that of the third gear position "3rd". In the fourth gear position "4th", the fourth rotary element RM4 and the ring gear R1 are rotated together at a reduced speed, while the first rotary element RM1 and the input shaft 22 are rotated together, so that the third rotary element RM3 is rotated at a speed represented by an inclined straight line labeled "4th" in the collinear chart. When the first clutch C1 and the second clutch C2 are engaged, the automatic transmission 10 is placed in a fifth gear position "5th" having a speed ratio lower than that of the fourth speed position "4th". In the fifth gear position "5th", the fourth rotary element RM4 and the ring gear R1 are rotated together at a reduced speed, while the second rotary element RM2 and the input shaft 22 are rotated together, so that the third rotary element RM3 is rotated at a speed represented by an inclined straight line labeled "5th" in the collinear chart.

When the second clutch C2 and the fourth clutch C4 are engaged, the automatic transmission 10 is placed in a sixth gear position "6th" having a speed ratio lower than that of the fifth gear position "5th". In the sixth gear position "6th", the second transmission portion 20 and the input shaft 22 are rotated together, so that the third rotary element RM3 is rotated at a speed represented by a horizontal straight line labeled "6th" in the collinear chart, that is, at the same speed as the input shaft 22. The speed ratio of the sixth gear position "6th" is equal to 1.0. When the second clutch C2 and the third clutch C3 are engaged, the automatic transmission 10 is placed in a seventh gear position "7th" having a speed ratio lower than that of the sixth gear position "6th". In the seventh gear position "7th", the second rotary element RM2 and the input shaft 22 are rotated together, while the first rotary element RM1 and the ring gear R1 are rotated together at a reduced speed, so that the third rotary element RM3 is rotated at a speed represented by an inclined straight line labeled "7th" in the collinear chart. When the second clutch C2 and the first brake B1 are engaged, the automatic transmission 10 is placed in an eighth gear position "8th" having a speed ratio lower than that of the seventh gear position "7th". In the eighth gear position "8th", the second rotary element RM2 and the input shaft 22 are rotated together, while the first rotary element RM1 is held stationary, so that the third rotary element RM3 is rotated at a speed represented by an inclined straight line labeled "8th" in the collinear chart. The first through eighth gear positions "1st" through "8th" are forward-drive gear positions.

When the second brake B2 and the third clutch C3 are engaged, the automatic transmission 10 is placed in a first reverse gear position "Rev1" in which the second rotary element RM2 is held stationary while the first rotary element RM1 and the ring gear R1 are rotated together at a reduced speed, so that the third rotary element RM3 is rotated in the reverse direction at a speed represented by an inclined straight line labeled "Rev1" in the collinear chart. When the second brake B2 and the fourth clutch C4 are engaged, the automatic transmission 10 is placed in a second reverse gear position "Rev2" in which the second rotary element RM2 is held stationary while the first rotary element RM1 and the input shaft 22 are rotated together, so that the third rotary element RM3 is rotated in the reverse direction at a speed represented by an inclined straight line labeled "Rev2" in the collinear chart.

The table of FIG. 1B indicates the relationship between the gear positions of the automatic transmission 10 and the respective combinations of the operating states of the clutches C1–C4 and brakes B1 and B2. In the table, "O"

represents the engaged state of the clutches and brakes, while "O" represents the engaged state of the clutches and brakes which is established to apply an engine brake to the vehicle. In the presence of the one-way clutch F1 disposed in parallel with the second brake B2 which is engaged to establish the first gear position "1st", the second brake B2 need not be engaged to start or accelerate the vehicle with the automatic transmission 10 placed in the first gear position "1st". The speed ratios of the individual gear positions are determined by the gear ratios ρ1, ρ2 and ρ3 of the first, second and third planetary gear sets 12, 16, 18.

The above-described clutches C1–C4 and brakes B1 and B2 are hydraulically operated frictional coupling devices, each of which may be a multiple-disc clutch or brake having a plurality of mutually superposed friction plates which are forced against each other by a hydraulic actuator. These clutches C and brakes B are engaged and released by energizing and de-energizing solenoid coils of respective linear solenoid valves SL1–SL6 incorporated in a hydraulic control unit 98 shown in the block diagram of FIG. 3, and transient fluid pressures of the clutches C and brakes B during their engaging and releasing actions are controlled by controlling the electric current applied to the solenoid coils. The hydraulic control diagram of FIG. 4 shows major elements of the hydraulic control unit 98, which includes hydraulic actuators 34, 36, 38, 40, 42 and 44 in the form of hydraulic cylinders for the respective clutches C1–C4 and brakes B1 and B2. The hydraulic cylinders 34–44 are supplied with a pressurized working fluid having a line pressure PL, which is delivered from a hydraulic pressure source 46. The pressure of the fluid having the line pressure PL is regulated by each of the linear solenoid valves SL1–SL6, so that the regulated fluid pressure is applied to the corresponding hydraulic actuator 34–44. The hydraulic pressure source 46 includes a mechanical type oil pump 48 driven by the engine 30, and a regulator valve operable to adjust the line pressure PL according to a load acting on the engine 30.

Figure 5:
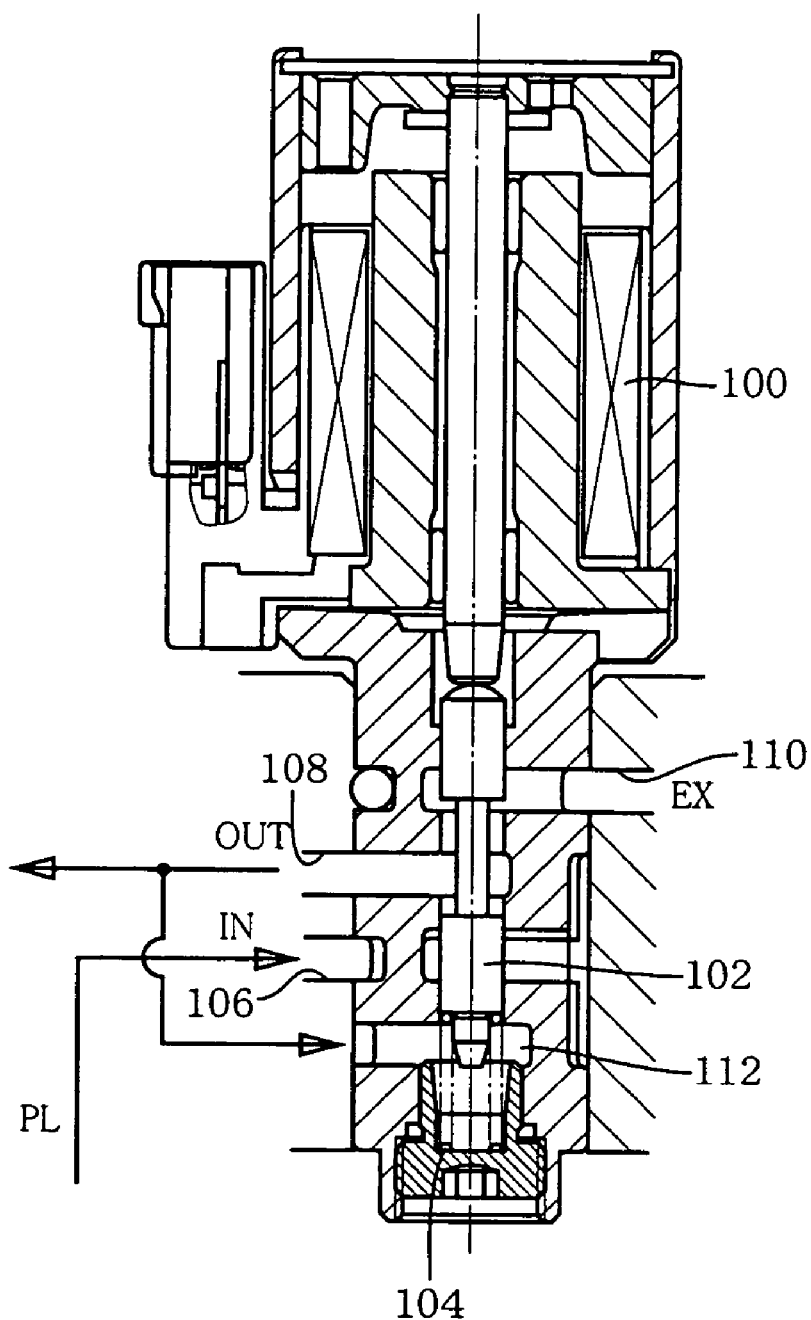
FIG. 5 is an elevational view in axial cross section showing one of linear solenoid valves shown in FIG. 3.

The linear solenoid valves SL1–SL6 are identical in basic construction with each other, and are normally-closed valves. As shown in FIG. 5, each linear solenoid valve SL: includes a solenoid 100; a spool 102; a spring 104; an input port 106 which receives the line pressure PL; an output port 108 from which a regulated output fluid pressure is applied to the corresponding actuator 34–44; a drain port 110; and a feedback chamber 112 which receives the output fluid pressure. The solenoids 100 of the linear solenoid valves SL1–SL6 are controlled independently of each other by an electronic control unit 90 shown in FIG. 3, to regulate the fluid pressures of the hydraulic actuators 34–44 independently of each other. When the amount of electric current applied to each linear solenoid valve SL is controlled by the electronic control unit 90, the linear solenoid valve SL is placed in a pressure-regulating state in which the spool 102 is movable to a position of equilibrium of forces so as to satisfy the previously indicated equation (1), namely, F=Pf× Af+Fs, wherein "F", "Pf", "Af" and "Fs" respectively represent: an electromagnetic force F which is produced by the solenoid 100 and which acts on the spool 102 in a first direction toward the spring 104; a feedback pressure which is received by the feedback chamber 112 and which provides a force acting on the spool 102 in a second direction opposite to the first direction; a pressure-receiving surface area of the spool 102 partially defining the feedback chamber 112; and a biasing force of the spring 104 which acts on the spool 102 in the second direction. In this pressure-regulating state of the linear solenoid valve SL, the output fluid pressure (feedback pressure Pf received by the feedback chamber 112) is regulated according to the electromagnetic force F produced by the solenoid 100.

When the solenoid 100 is in the de-energized state without application of an electric current from the electronic control unit 90, the linear solenoid valve SL is placed in a non-pressure-regulated state in which the spool 102 is held at a stroke end on the side of the solenoid 100, under the biasing force Fs of the spring 104, as shown in FIG. 5, so that no output fluid pressure is generated from the linear solenoid valve SL. The pressure-regulating state may be a lowest-pressure-regulating state which is established by minimizing the amount of electric current to be applied to the solenoid 100, within a range of the amount of electric current in which the spool 102 is movable to the position of equilibrium of forces according to the above-indicated equation (1). In this lowest-pressure-regulating state, too, the pressurized fluid flows into the input port 106 and is discharged from the drain port 110, so as to maintain the lowest feedback pressure Pf corresponding to the position of equilibrium.

Figure 3:
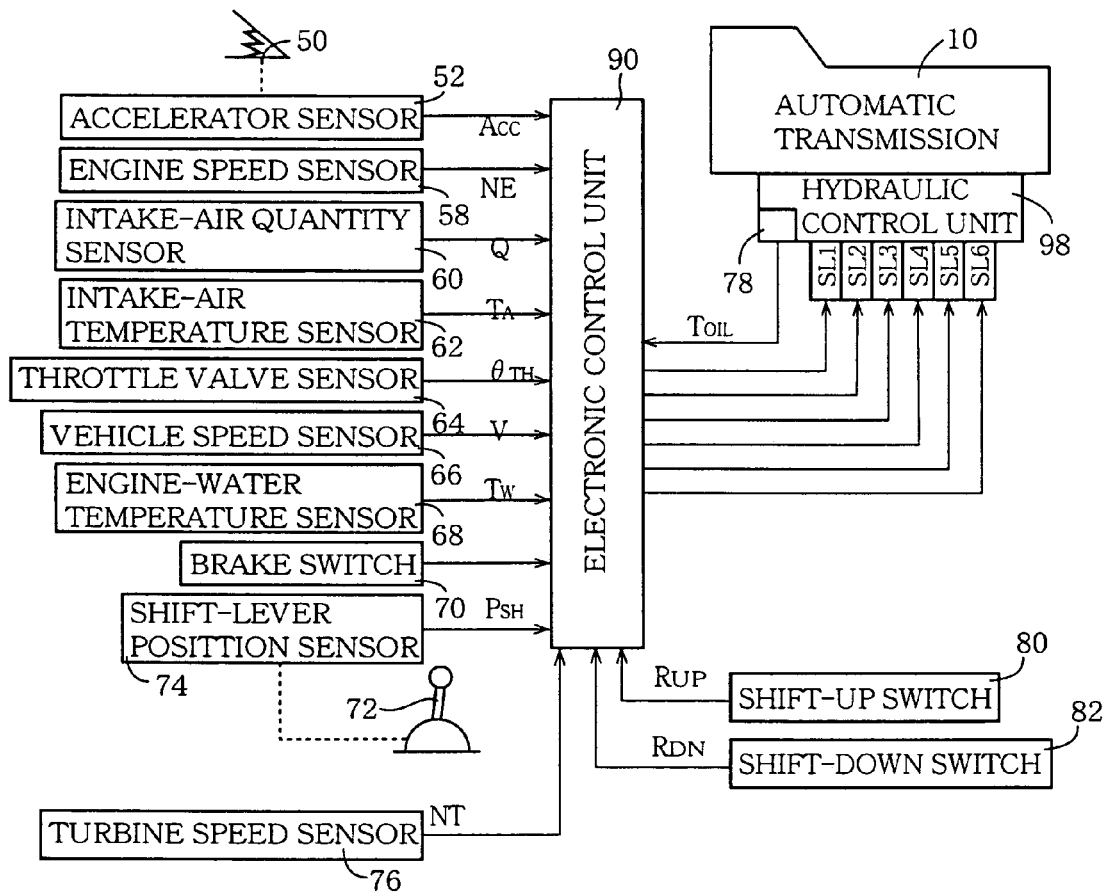
FIG. 3 is a block diagram showing major elements of a control system for controlling the vehicular automatic transmission of FIG. 1A.
Figure 4:
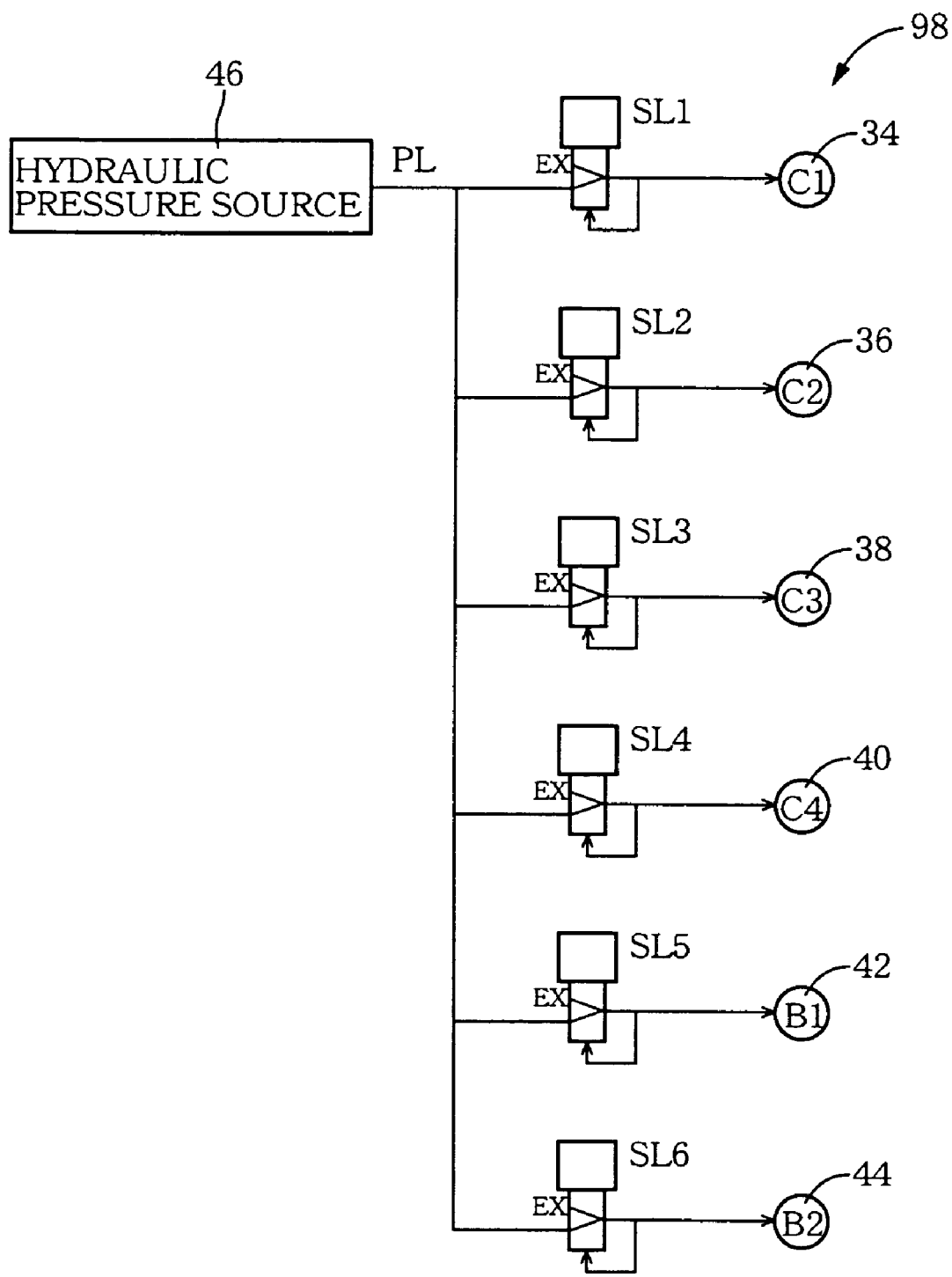
FIG. 4 is a hydraulic circuit diagram illustrating major elements of a hydraulic control unit shown in FIG. 3.

Referring back to the block diagram of FIG. 3 illustrating a control system provided to control the automatic transmission 10 and other devices of the vehicle, the control system includes: an accelerator sensor 52 operable to detect a vehicle-operator's required output of the engine 30 in the form of an operating amount $A_{CC}$ of an accelerator pedal 50 functioning as a vehicle accelerating member; an engine speed sensor 58 operable to detect a speed $N_E$ of the engine 30; an intake-air quantity sensor 60 operable to detect an intake air quantity Q of the engine 30; an intake-air temperature sensor 62 operable to detect a temperature $T_A$ of the intake air; a throttle valve sensor 64 equipped with an engine idling switch, which is operable to detect an opening angle $\theta_{TH}$ of an electronic throttle valve, and a fully closed state of the electronic throttle valve (idling state of the engine 30); a vehicle speed sensor 66 operable to detect a running speed V of the vehicle (rotating speed $N_{OUT}$ of the output shaft 24); an engine-water temperature sensor 68 operable to detect a temperature $T_W$ of cooling water of the engine 30; a brake switch 70 operable to detect an operation of a service brake system of the vehicle; a sift-lever position sensor 74 operable to detect a presently selected position $P_{SH}$ of a manually operable member in the form of a shift lever 72; a turbine speed sensor 76 operable to detect a rotating speed NT of the turbine of the torque converter 32 (rotating speed $N_{IN}$ of the input shaft 22); an oil temperature sensor 78 operable to detect a temperature $T_{OIL}$ of the working fluid of the hydraulic control unit 98; a shift-up switch 80 operable to generate a shift-up command $R_{UP}$ for shifting up the automatic transmission 10; and a shift-down switch 82 operable to generate a shift-down command $R_{DN}$ for shifting down the automatic transmission 10. The electronic control unit 90 receives output signals of those sensors and switches indicative of the accelerator operating amount $A_{CC}$, engine speed $N_E$, intake-air quantity Q, intake-air temperature $T_A$, throttle opening angle $\theta_{TH}$, vehicle speed V, engine water temperature $T_W$, operation of the service brake system, shift lever position $PS_H$, turbine speed $N_T$, fluid temperature $T_{OIL}$, shift-up command $R_{UP}$ and shift-down command $R_{DN}$.

Figure 6:
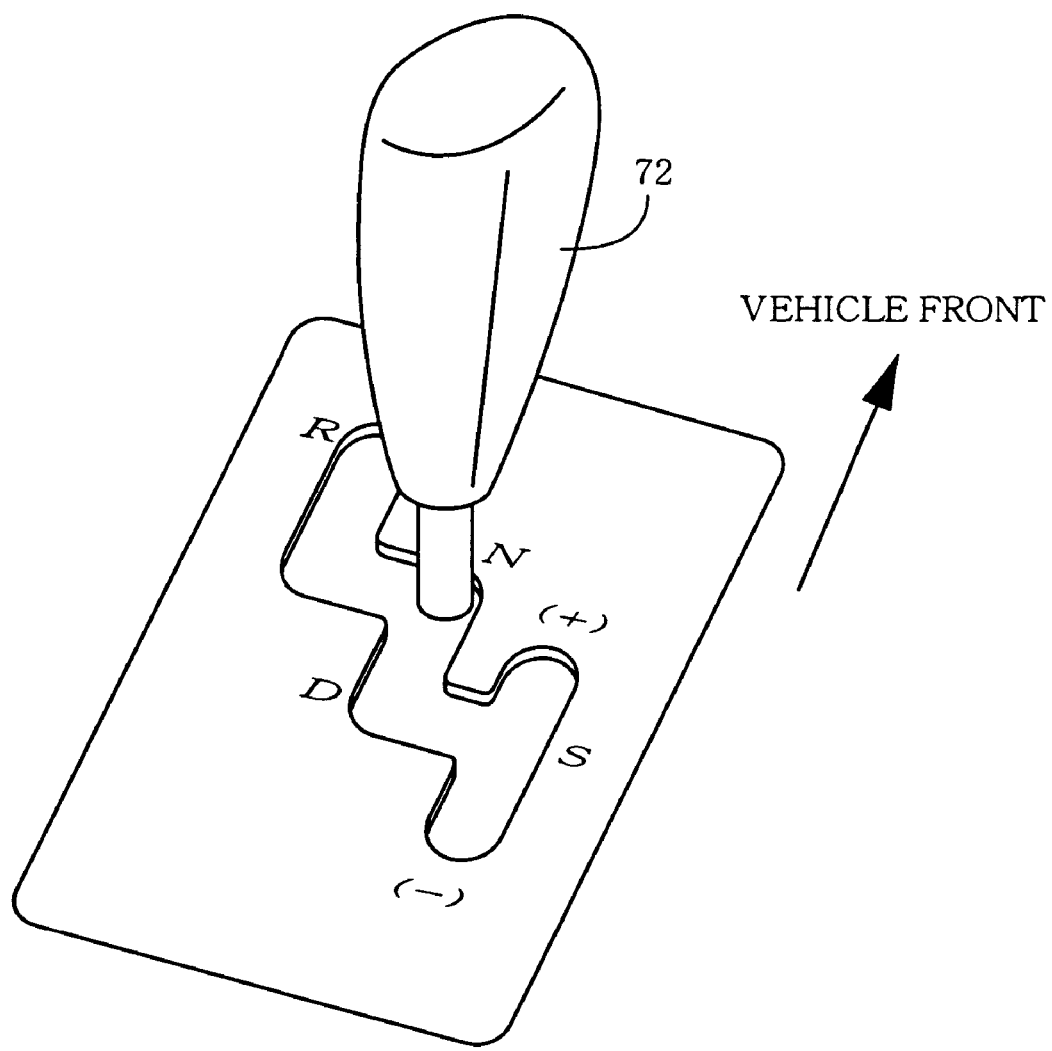
FIG. 6 is a perspective view illustrating one example of a shift lever shown in FIG. 3.

The shift lever 72 is disposed near a vehicle-operator's seat of the vehicle, and has four positions: a reverse position R; neutral position N; a drive position D (automatic shifting position); and a sequential position S (manual shifting position), as shown in FIG. 6. The reverse position R is selected to drive the vehicle in the backward or reverse direction. In the neutral position N, vehicle drive power is not transmitted from the engine 30 to the drive wheels. The drive position D is selected to drive the vehicle in the forward direction with automatic shifting actions of the automatic transmission 10. The sequential position S is selected to drive the vehicle in the forward direction such that the automatic transmission 10 may be shifted up or down by operating the shift lever 72 from the sequential position S to a shift-up position "+" or a shift-down position "−" indicated in FIG. 6. As described below in detail by reference to FIG. 8, one of eight shift ranges L, 2–7 and D can be selected by operating the shift lever 72 to the shift-up position "+" or shift-down position "−", to select the number of the gear positions of the automatic transmission 10 available for automatic shifting. As indicated above, the shift-lever position sensor 74 detects the presently selected one of the positions R, N, D and S of the shift lever 72. As is apparent from FIG. 6, the reverse position R, neutral position N and drive position D are spaced apart from each other in the longitudinal or running direction of the vehicle. The sequential position S is located at the same position as the drive position D in the vehicle running direction. The hydraulic control unit 98 includes a manual valve operatively connected to the shift lever 72 through a cable or link, so that the manual valve is mechanically operated by a movement of the shift lever 72 in the vehicle running direction, such that a reverse drive hydraulic pressure $P_R$ is generated from the manual valve upon operation of the shift lever 72 to the reverse position R, to establish a reverse drive hydraulic circuit for placing the automatic transmission 10 in the first or second reverse gear position "Rev1" or "Rev2", while a neutral drive hydraulic circuit is established upon operation of the shift lever 72 to the neutral position N, to place all of the clutches C1–C4 and brakes B1, B2 in the released state, for placing the automatic transmission 10 in the neutral position N for power disconnection between the engine 30 and the drive wheels.

Figures 7, 8:
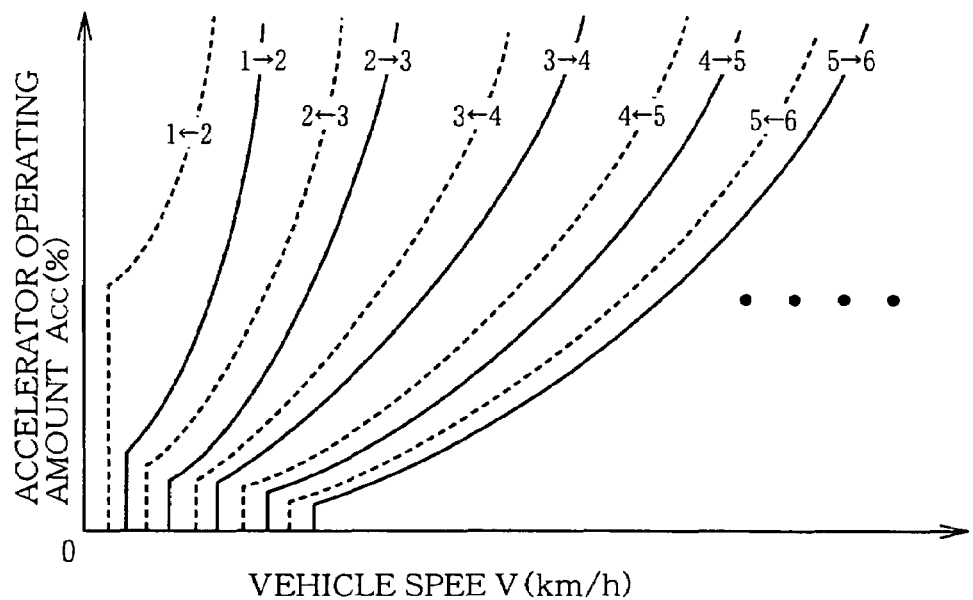
FIG. 7 is a view indicating an example of shift-up and shift-down boundary lines represented by a shifting boundary line map used for automatic shifting of the vehicular automatic transmission of FIG. 1A according to a running state of the vehicle.
FIG. 8 is a view indicating shift ranges of the vehicular automatic transmission which are selectively established by operating the shift lever.

Upon operation of the shift lever 72 to the drive position (automatic shifting position) D or sequential position (manual shifting position) S, a forward drive hydraulic pressure $P_D$ is generated from the manual valve to establish a forward drive hydraulic circuit for placing the automatic transmission 10 in one of the eight forward drive gear positions "1st" through "8th". When an operation of the shift lever 72 to the drive position D is detected by the shift-lever position sensor 74, the electronic control unit 90 commands the hydraulic control unit 98 to place the automatic transmission 10 in an automatic shifting mode in which the automatic transmission 10 is automatically shiftable to any one of the eight forward-drive gear positions "1st" through "8th", with an appropriate combination of the engaged and released states of the clutches C and brakes B which is established by energization and de-energization of the linear solenoid valves SL1–SL6, on the basis of a running condition of the vehicle and according to a predetermined shifting rule in the form of a shifting map stored in a ROM of the electronic control unit 90. An example of the shifting map is illustrated in FIG. 7, which is a shifting boundary line map representing shift-up boundary lines indicated by solid lines, and shift-down boundary lines indicated by broken lines. Each boundary line represents a relationship between the vehicle speed V and the accelerator operating amount $A_{CC}$, which is determined such that the automatic transmission 10 is shifted down to increase the speed ratio, as the detected vehicle speed V is lowered at a given value of the accelerator operating amount $A_{CC}$, or as the detected accelerator operating amount $A_{CC}$ is increased at a given value of the vehicle speed V, as is apparent from FIG. 7. However, the parameters used for automatic shifting actions of the automatic transmission 10 are not limited to the vehicle speed V and the accelerator operating amount $A_{CC}$. For instance, the accelerator operating amount $A_{CC}$ may be replaced by the intake-air quantity Q, and a surface gradient of a roadway on which the vehicle is running may be used as one of the control parameters.

When an operation of the shift lever 72 to the sequential position (manual shifting position) S is detected by the shift-lever position sensor 74, the electronic control unit 90 commands the hydraulic control unit 98 to place the automatic transmission 10 in a manual shifting mode in which the automatic transmission 10 is automatically shiftable to any one of the forward-drive gear positions within a selected one of the eight shift ranges L, 2–7 and D as described above. The sequential position S is located at the same position as the drive position D in the vehicle running direction, and the forward drive hydraulic circuit is established in the sequential position S, as in the drive position D. However, the manual shifting mode is electrically established upon operation of the shift lever 72 to the sequential position S, to limit the number of the gear positions available for automatic shifting of the automatic transmission 10. Described in greater detail, the above-indicated shift-up position "+" and shift-down position "−" are located on the respective front and rear sides of the sequential position S. When an operation of the shift lever 72 to the shift-up position "+" or shift-down position "−" is detected by the shift-up switch 80, the shift-up command $R_{UP}$ is generated to change the presently established shift range to the new shift range in which the number of the gear positions available is larger by one than that of the presently established shift range. Accordingly, the shift-up command $R_{UP}$ changes the highest gear position (having the lowest speed ratio) available, in the direction of lowering the speed ratio, for example, from the fourth gear position "4th" to the fifth gear position "5th" when the shift lever 72 is operated from the sequential position S to the shift-up position "+". When an operation of the shift lever 72 to the shift-down position "−" is detected by the shift-down switch 82, the shift-down command $R_{DN}$ is generated to change the presently established shift range to the new shift range in which the number of the gear positions available is smaller by one than that of the presently established shift range. Accordingly, the shift-down command $R_{DN}$ changes the highest gear position available, in the direction of increasing the speed ratio, for example, from the fifth gear position "5th" to the fourth gear position "4th" when the shift lever 72 is operated from the sequential position S to the shift-down position "−". Thus, each time the shift lever 72 is operated to the shift-up position "+" or the shift-down position "−", the presently established one of the eighth shift ranges L, 2–7 and D is changed to the next adjacent shift range so that the number of the gear positions available for automatic shifting of the automatic transmission 10 is incremented or decremented, with a result of a change of the highest gear position available for the automatic shifting. Within the newly established shift range, the automatic transmission 10 is automatically shifted up or down depending upon the running condition of the vehicle and according to the shifting boundary line map of FIG. 7. When the shift lever 72 is repeatedly operated to the shift-down position "−" during running of the vehicle on a downhill road, the shift range is sequentially changed from the shift range 4 toward the shift range L, so that the automatic transmission 10 may be sequentially shifted down from the fourth gear position "4th" toward the first gear position "1st", with a result of an increase of the engine braking force in steps. In the manual shifting mode, the first gear position "1st" is established by engaging the second brake B2 as well as the first clutch C1, so that an engine brake is applied to the vehicle in this first gear position.

The shift lever 72 is automatically returned from the shift-up position "+" or the shift-down position "−" back to the sequential position S, under a biasing action of biasing means such as a spring. While the shift range is changed according to the number of operations of the shift lever 72 to the shift-up or shift-down position "+", "−" in the illustrated embodiment, the shift range may be changed according to a time duration for which the shift lever 72 is held at the shift-up or shift-down position.

Figure 9:
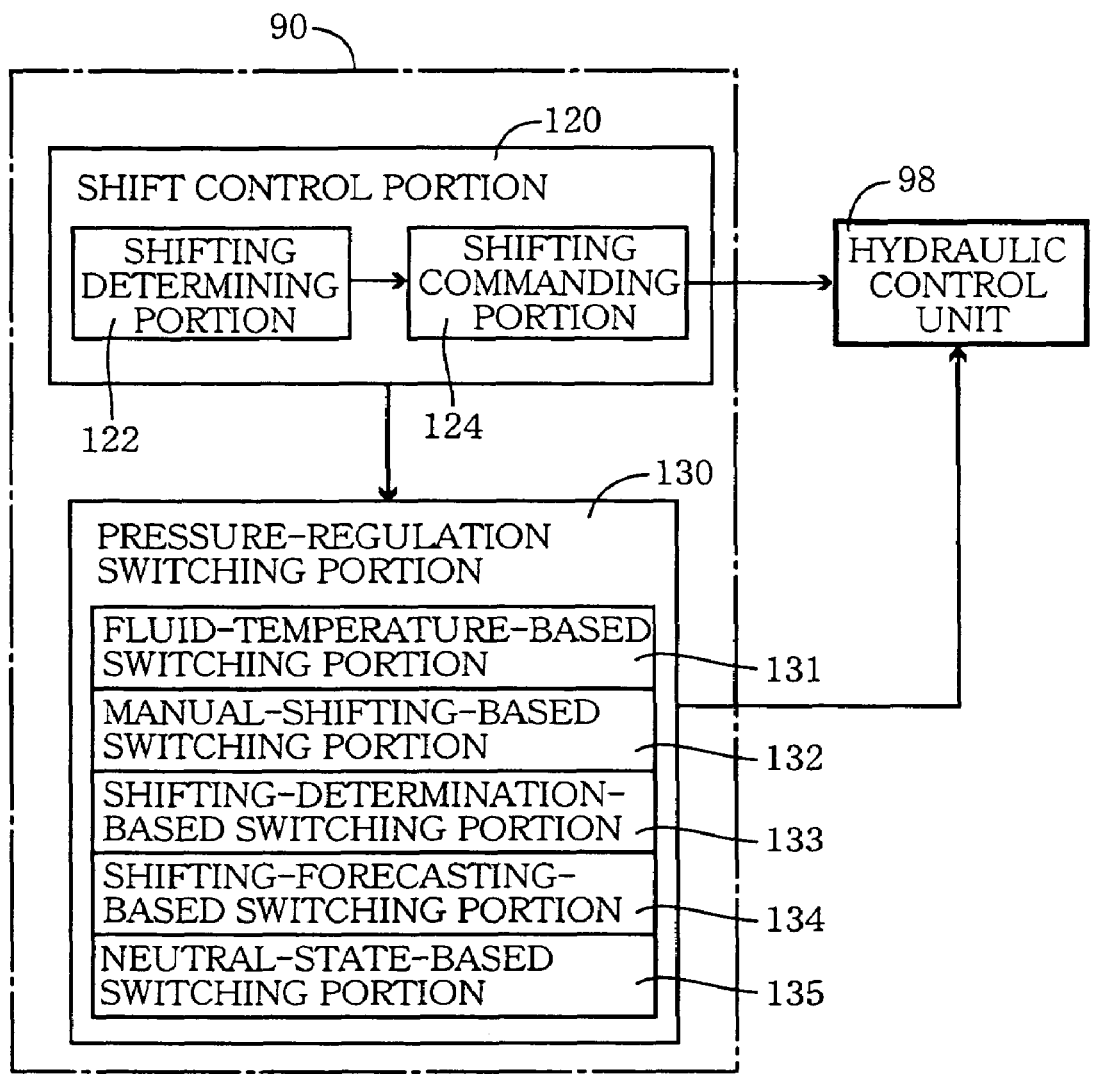
FIG. 9 is a block diagram illustrating functional portions of an electronic control unit shown in FIG. 3, which constitute the hydraulic control apparatus of the present invention.

The electronic control unit 90 is principally constituted by a microcomputer incorporating a CPU, a RAM, a ROM and an input-output interface. The CPU processes input signals according to control programs stored in the ROM, while utilizing a temporary data storage function of the RAM. As shown in FIG. 9, the electronic control unit 90 comprises a shift control portion 120 and a pressure-regulation switching portion 130. The pressure-regulation switching portion 130 includes a fluid-temperature-based switching portion 131, a manual-shifting-based switching portion 132, a shifting-determination-based switching portion 133, a shifting-forecasting-based switching portion 134, and a neutral-state-based switching portion 135, which will be described by reference to the flow charts of FIGS. 10–13.

The shift control means 120 is arranged to automatically shift the automatic transmission 10 on the basis of the presently selected position $P_{SH}$ of the shift lever 72 and according to the shifting boundary line map of FIG. 7, and includes a shifting determining portion 122 and a shifting commanding portion 124. The shifting determining portion 122 is operable to determine, on the basis of the detected vehicle speed V and the detected accelerator operating amount ACC and according to the shift-up and shift-down boundary lines of FIG. 7, whether the automatic transmission 10 should be shifted up or down. In response to the determination by the shifting determining portion 122, the shifting commanding portion 124 controls the linear solenoid valves SL1–SL6 of the hydraulic control unit 98, to establish the combination of the engaged and released states of the clutches C1–C4 and brakes B1, B2, which combination permits a shifting action of the automatic transmission 10 that should be implemented according to the determination by the shifting determining portion 122. The shifting commanding portion 124 commands the linear solenoid valves SL1–SL6 to initiate the fluid pressure regulation, at different timings with respect to the moment of determination by the shifting determining portion 122 that the shifting action in question of the automatic transmission 10 should take place. Namely, when the shifting determining portion 122 determines that a shift-down action of the automatic transmission 10 should take place during an operation of the accelerator pedal 50, or a shifting action of the automatic transmission 10 should take place with a high response to an operation of the shift lever 72 to the shift-up or shift-down position "+", "−" in the manual shifting mode, the shifting commanding portion 124 commands the linear solenoid valves SL to initiate the fluid pressure regulation immediately after the moment of the determination by the shifting determining portion 122. Upon determination by the shifting determining portion 122 of a shift-up action of the automatic transmission 10, or a shifting action of the automatic transmission 10 while the accelerator pedal 50 is in the non-operated position, on the other hand, the shifting commanding portion 124 commands the linear solenoid valves SL to initiate the fluid pressure regulation a predetermined time after the moment of the determination by the shifting determining portion 122, to prevent successive shifting actions of the automatic transmission 10 within a short length of time.

The pressure-regulation switching portion 130 is operable to selectively place each of the non-used linear solenoid valves SL in one of the above-described pressure-regulating and non-pressure regulating states, on the basis of the present state of the vehicle. Each non-used linear solenoid valve SL is a linear solenoid valve corresponding to the clutch C or brake B not to be engaged to establish the gear position according to the determination by the shifting determining portion 122. The non-pressure-regulating state is established by cutting off an electric current applied to the solenoid 100 of the linear solenoid valve SL. In the non-pressure-regulating state, the spool 102 is held at the stroke end on the side of the solenoid 100, under the biasing force Fs, so that the input port 106 is completed closed and no output fluid pressure is generated from the output port 108. The non-used linear solenoid valve SL is not placed in the pressure-regulating state to engage the corresponding clutch C or brake B, but is placed in this pressure-regulating state to minimize the output fluid pressure within a range of the electric current applied to the solenoid 100 in which the spool 102 is movable to a position of equilibrium of forces according to the above-indicated equation (1). That is, the pressure-regulating state in the present embodiment is the lowest-pressure-regulating state which is established by minimizing the amount of electric current to be applied to the solenoid 100 and in which the output fluid pressure is regulated to the lowest level which satisfies the above-equation (1).

The determination by the pressure-regulation switching portion 130 as to whether each non-used linear solenoid valve SL should be placed in the pressure-regulating state (lowest-pressure-regulating state) or in the non-pressure-regulating state is effected by the fluid-temperature-based switching means 131, manual-shifting-based switching portion 132, shifting-determination-based switching portion 133, shifting-forecasting-based switching portion 134 and neutral-state-based switching portion 135. The fluid-temperature-based switching portion 131 is arranged to execute a switching control routine illustrated in the flow chart of FIG. 10, and the manual-shifting-based switching portion 132 is arranged to execute a switching control routine illustrated in the flow chart of FIG. 11. The shifting-determination-based switching portion 133 and the shifting-forecasting-based switching portion 134 are arranged to execute a switching control routine illustrated in the flow chart of FIG. 12, and the neutral-state-based switching portion 135 is arranged to execute a switching control routine illustrated in the flow chart of FIG. 13. It will be understood that the shifting control portion 120 and the pressure-regulation switching portion 130 constitute a major portion of the hydraulic control apparatus for controlling the automatic transmission 10.

Figure 10:
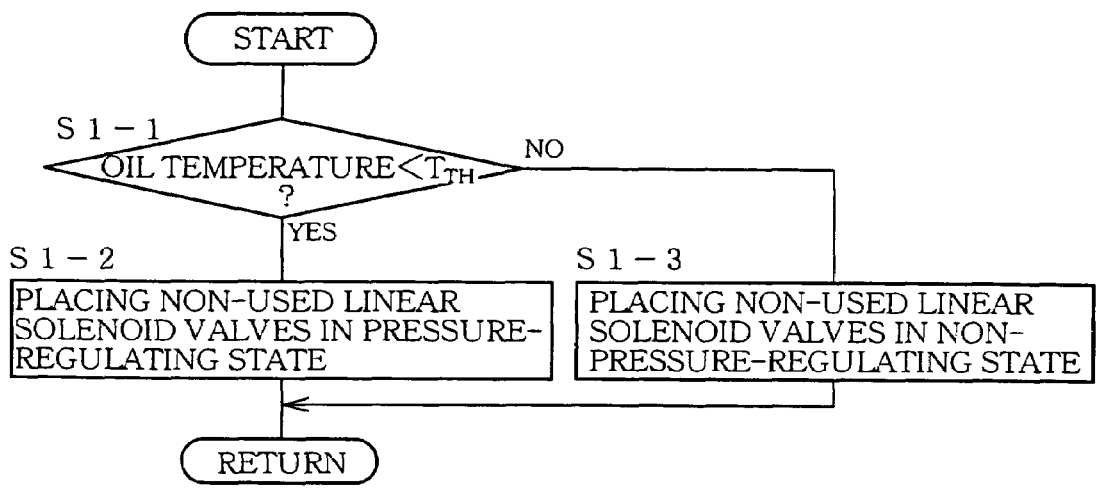
FIG. 10 is a flow chart illustrating a switching routine executed by the hydraulic control apparatus to selectively place of each non-used linear solenoid valve in a pressure-regulated state or a non-pressure-regulated state, depending upon an oil temperature of the hydraulic control unit.

The switching control routine of FIG. 10 is initiated with step S1-1 to determine whether the temperature $T_{OIL}$ of the working fluid in the hydraulic control unit 98 is lower than a predetermined threshold value $T_{TH}$. If an affirmative decision (YES) is obtained in step S1-1, the control flow goes to step S1-2 to place all of the non-used linear solenoid valves SL in the lowest-pressure-regulating state (pressure-regulating state). If a negative decision (NO) is obtained in step S1-1, the control flow goes to step S1-3 to place all of the non-used linear solenoid valves SL in the non-pressureregulating state. That is, when the working fluid has a relatively low temperature and a relatively high viscosity, the linear solenoid valves SL and the hydraulic actuator 34–44 tend to have a relatively low control response. In view of this fact, each non-used linear solenoid valve SL is placed in the lowest-pressure-regulating state, rather than in the non-pressure-regulating state when the fluid temperature $T_{OIL}$ is relatively low. When the working fluid has a relatively high temperature and a relatively low viscosity, the linear solenoid valves SL tend to have a relatively large amount of leakage flow, and a relatively high rate of fluid flow therethrough if placed in the pressure-regulating state (lowest-pressure-regulating state). In this respect, each non-used linear solenoid valve SL is placed in the non-pressure-regulating state, to reduce the required delivery of the pressurized fluid from the oil pump 48 and to reduce the load acting on the engine 30 used as the drive power source for driving the oil pump 48, for thereby improving the fuel economy of the vehicle.

Figure 11:
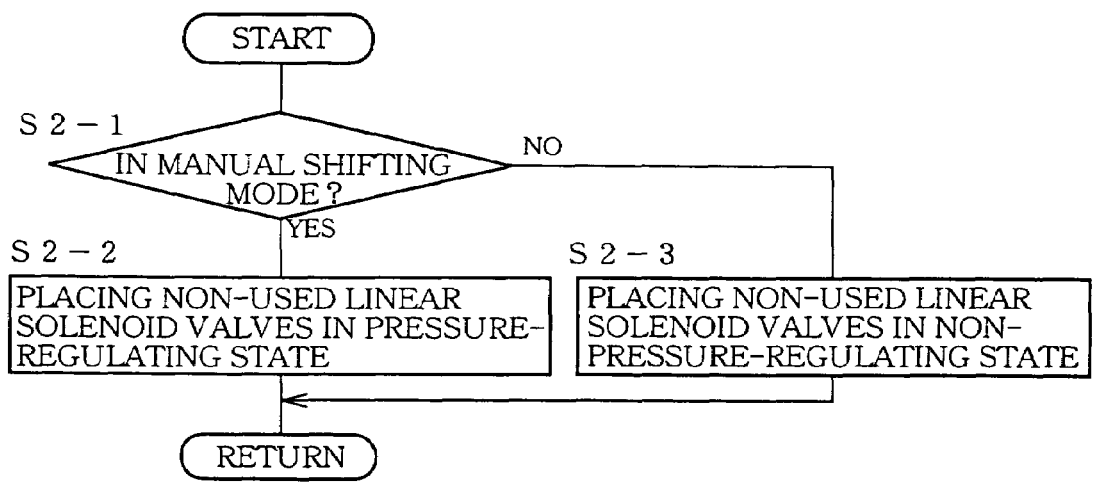
FIG. 11 is a flow chart illustrating a switching control routine executed by the hydraulic control apparatus to selectively place each non-used linear solenoid valve in the pressure-regulating or non-pressure regulating state, depending upon whether the shift lever is placed in the manual shifting position or not.

The switching control routine of FIG. 11 is initiated with step S2-1 to determine whether the automatic transmission 10 is placed in the manual shifting mode, that is, whether the shift lever 72 is placed in the sequential position (manual shifting position) S. This determination in step S2-1 is made on the basis of the output of the shift-lever position sensor 74 indicative of the presently selected position $P_{SH}$ of the shift lever 72. If an affirmative decision (YES) is obtained in step S2-1, the control flow goes to step S2-2 to place all of the non-used linear solenoid valves SL in the lowest-pressure-regulating state. If the automatic transmission 10 is placed in the automatic shifting mode with the shift lever 72 placed in the drive position (automatic shifting position) D, a negative decision (NO) is obtained in step S2-1, and the control flow goes to step S2-3 to place all of the non-used linear solenoid valves SL in the non-pressure-regulating state. That is, the vehicle operator desires a relatively high hydraulic shifting response of the automatic transmission 10 in the manual shifting mode in which the shift lever 74 is operated by the vehicle operator for the purpose of manually shifting up or down the automatic transmission 10. In this respect, the hydraulic shifting response can be improved by placing each non-used linear solenoid valve in the lowest-pressure-regulating state (pressure-regulating state). In the automatic shifting mode, on the other hand, it is possible to reduce the required delivery of the pressurized fluid from the oil pump 48 and the load acting on the engine 30 used as the drive power source for driving the oil pump 48, for thereby improving the fuel economy of the vehicle, by placing each non-used linear solenoid valve SL in the non-pressure-regulating state.

Figure 12:
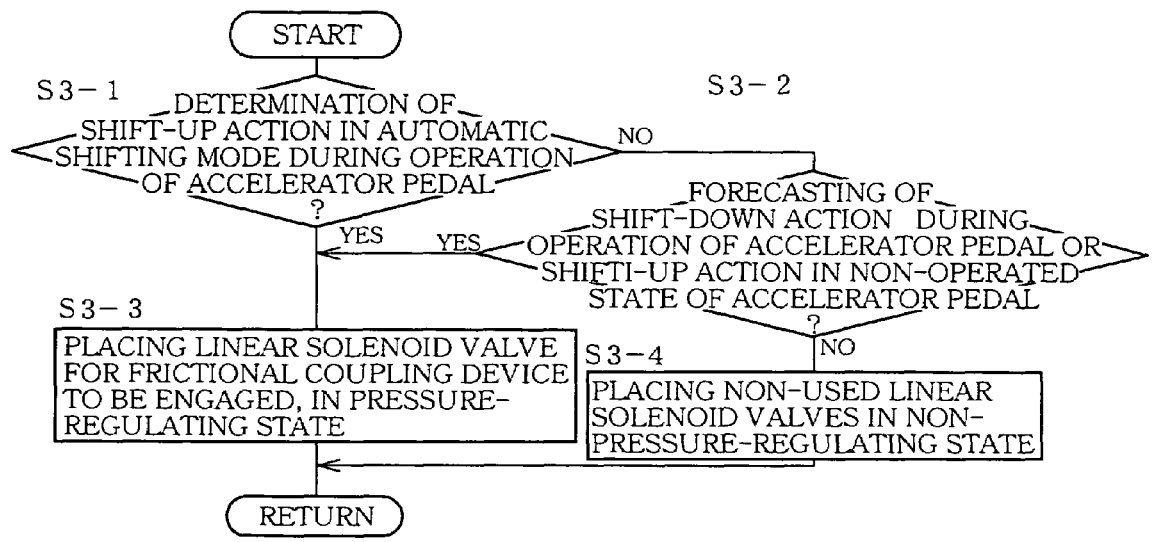
FIG. 12 is a flow chart illustrating a switching control routine executed by the hydraulic control apparatus to selectively placing each non-used linear solenoid valve in the pressure-regulating or non-pressure-regulating state, depending upon whether a shifting action of the automatic transmission has been determined or forecast.

The switching control routine of FIG. 12 is initiated with step S3-1 to determine whether the shifting determining portion 122 has determined that a shift-up action of the automatic transmission 10 should take place in the automatic shifting mode during an operation of the accelerator pedal 50. In this respect, it is noted that the shifting commanding portion 124 commands the linear solenoid valves SL to initiate this type of shift-up action of the automatic transmission 10 at a point of time a relatively long time after the moment of the determination by the shifting determining portion 122. If an affirmative decision (YES) is obtained in step S3-1, the control flow goes to step S3-3 to place the linear solenoid valve SL corresponding to the clutch C or brake B to be engaged to effect the shift-up action in question, in the lowest-pressure-regulating state.

When a negative decision (NO) is obtained in step S3-1, the control flow goes to step S3-2 to forecast whether a shift-down action of the automatic transmission 10 during an operation of the accelerator pedal 50, or a shift-up action of the automatic transmission 10 in the non-operated state of the accelerator pedal 50, will take place in the near future in the automatic shifting mode. This determination in step S3-2 is made on the basis of the detected vehicle speed V and operating amount $A_{CC}$ of the accelerator pedal 50 and according to the shifting boundary line map of FIG. 7. In the present embodiment, the shifting commanding portion 124 is arranged to command the linear solenoid valves SL to initiate the shift-down action during an operation of the accelerator pedal 50, at a point of time immediately after the moment of the determination by the shifting determining portion 122. The shift-up action in the non-operated state of the accelerator pedal 50 can be easily forecast on the basis of a change of the operating amount $A_{CC}$ of the accelerator pedal 50. If an affirmative decision (YES) is obtained in step S3-2, the control flow goes to step S3-3 to place the linear solenoid valve SL corresponding to the clutch C or brake B to be engaged to effect the shift-down action or shift-up action in question, in the lowest-pressure-regulating state. If a negative decision (NO) is obtained in both step S3-1 and step S3-2, the control flow goes to step S3-4 to place all of the non-used linear solenoid valves SL in the non-pressure-regulating state.

According to the switching control routine of FIG. 12, all of the non-used linear solenoid valves SL are basically or normally placed in the non-pressure-regulating state, so that the required delivery of the pressurized fluid from the oil pump 48 can be reduced, with a result of reduction of the load of the engine 30 used to drive the oil pump 48, whereby the fuel economy of the vehicle can be improved. In the event of determination of a shift-up action of the automatic transmission 10 in the automatic shifting mode during an operation of the accelerator pedal 50, or in the event of forecasting of a shift-down action of the automatic transmission 10 during an operation of the accelerator pedal 50 or a shift-up action of the automatic transmission 10 in the non-operated state of the accelerator pedal 50, the linear solenoid valve SL corresponding to the clutch C or brake B to be engaged to effect the determined shift-up action or forecast shift-down or shift-up action is placed in the lowest-pressure-regulating state, before the shifting commanding portion 124 commands the linear solenoid valves SL to initiate the shifting action in question. Accordingly, the hydraulic shifting response of the automatic transmission 10 can be improved.

Figure 13:
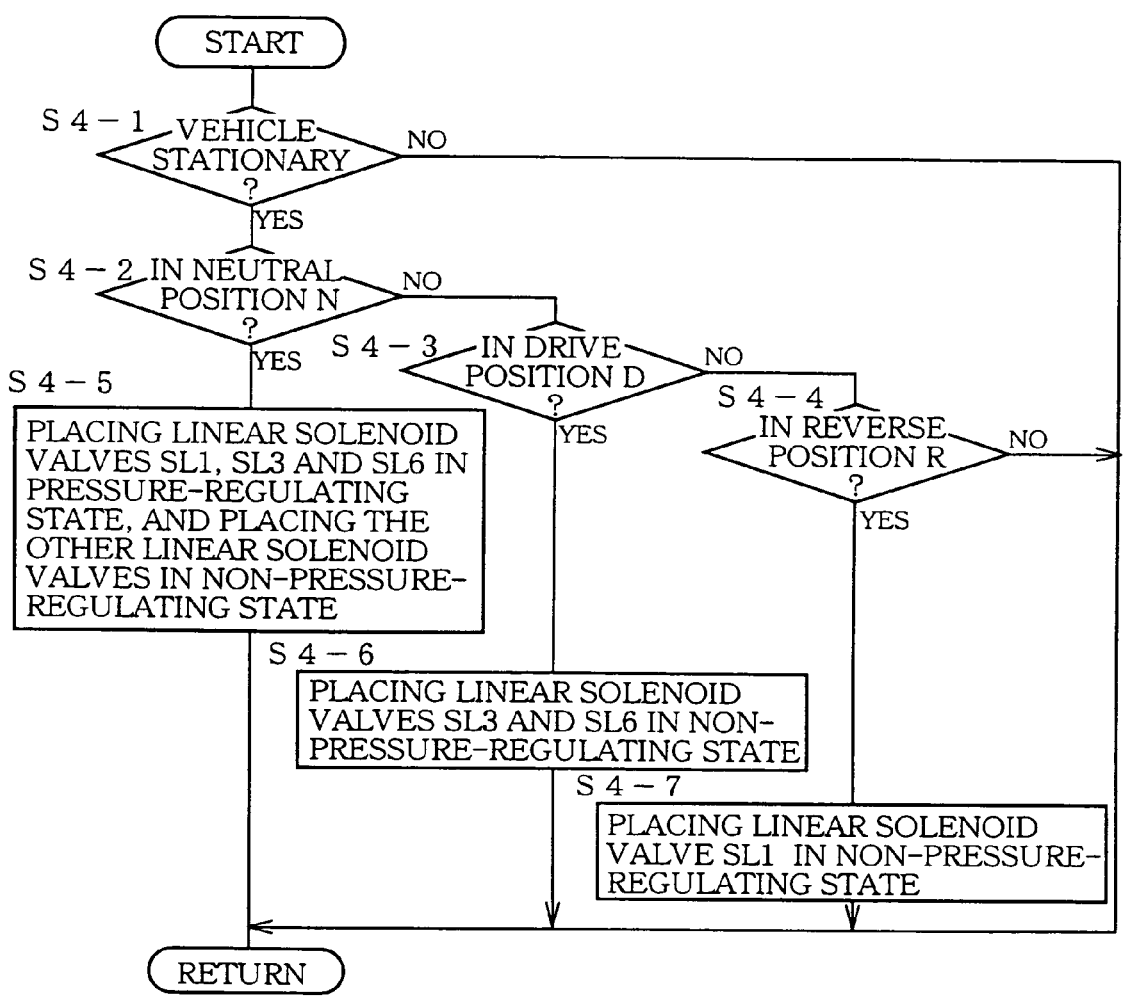
FIG. 13 is a flow chart illustrating a switching control routine executed by the hydraulic control apparatus to selectively place each non-used linear solenoid valve in the pressure-regulating or non-pressure-regulating state, depending upon the position of the shift lever selected while the vehicle is stationary.

The switching control routine of FIG. 13 is initiated with step S4-1 to determine whether the vehicle is stationary. This determination in step S4-1 is made on the basis of the vehicle speed V. If an affirmative decision (YES) is obtained in step S4-1, the control flow goes to step S4-2 to determine whether the shift lever 72 is placed in the neutral position N. This determination in step S4-2 is made on the basis of the presently selected position PSH of the shift lever 72 detected by the shift-lever position sensor 74. If an affirmative decision(YES) is obtained in step S4-2, the control flow goes to step S4-5 in which the linear solenoid valve SL1 for the first clutch C1 to be engaged to establish the first forward-drive gear position "1st" and the linear solenoid valves SL3 and SL6 for the third clutch C3 and second brake B2 to be engaged to establish the first reverse gear position "Rev1" are placed in the lowest-pressure-regulating state, while the other linear solenoid valves SL2, SL4 and SL5 are placed in the non-pressure-regulating state. The first forward-drive and reverse gear positions "1st" and "Rev1" are established when the vehicle is started after the shift lever 72 is placed in the neutral position N.

If a negative decision (NO) is obtained in step S4-2, the control flow goes to step S4-3 to determine whether the shift lever 72 is placed in the drive position D. If an affirmative decision (YES) is obtained in step S4-3, the control flow goes to step S4-6 in which the linear solenoid valves SL3 and SL6 for the third clutch C3 and second brake B2 are placed in the non-pressure-regulating state. If a negative decision (NO) is obtained in step S4-3, the control flow goes to step S4-4 to determine whether the shift lever 72 is placed in the reverse position R. If an affirmative decision (YES) is obtained in step S4-4, the control flow goes to step S4-7 in which the linear solenoid valve SL1 for the clutch C1 is placed in the non-pressure-regulating state.

As described above, the linear solenoid valves SL1, SL3 and SL6 for the first and third clutches C1, C3 and the second brake B2 which are to be engaged when the shift lever 72 is operated from the neutral position N to the drive position D or reverse position R are placed in the lowest-pressure-regulating state, while the other linear solenoid valves SL2, SL4 and SL5 are placed in the non-pressure-regulating state, so that the hydraulic shifting response of the automatic transmission 10 upon sifting to the first forward-drive gear position "1st" or first reverse gear position "Rev1" can be improved, and the required delivery of the pressurized fluid from the oil pump 48 and the load of the engine 30 used to drive the oil pump can be reduced, whereby the fuel economy of the vehicle can be improved.

The hydraulic control apparatus according to the present invention provided to control the automatic transmission 10 is arranged to effect a determination on the basis of the present vehicle state as to whether each non-used linear solenoid valve SL not used to engage the corresponding clutch C or brake B should be placed in the pressure-regulating state in the form of the lowest-pressure-regulating state or in the non-pressure-regulating state, and is further arranged to place each non-used linear solenoid valve selectively in one of the lowest-pressure-regulating state and the non-pressure-regulating state, according to a result of the determination. Since some of the non-used linear solenoid valves are placed in the non-pressure-regulating state, the required delivery of the pressurized fluid from the oil pump 48 can be reduced, and the required capacity of the oil pump 48 can be reduced, so that the load acting on the engine used as the drive power source for driving the oil pump 48 can be reduced, whereby the fuel economy of the vehicle can be improved. In addition, some of the non-used linear solenoid valves are placed in the lowest-pressure-regulating state, so that the hydraulic shifting response of the automatic transmission 10 can be improved.

As described above, the pressure-regulation switching portion 130 of the illustrated hydraulic control apparatus is arranged to execute the switching control routines of FIGS. 10–13 for selectively place each non-used linear solenoid valve SL in one of the pressure-regulating state (lowest-pressure-regulating state) and the non-pressure-regulating state, depending upon the various conditions of the vehicle such as the working fluid temperature of the hydraulic control unit 98, the selection of the manual shifting mode, the determination or forecast of the specific shifting actions of the automatic transmission 10, and the selection of the neutral position N, drive position D or reverse position R of the shift lever 72 while the vehicle is stationary. For assuring a high degree of hydraulic shifting response of the automatic transmission 10, the pressure-regulating switching portion 130 is arranged to place each non-used linear solenoid valve in the lowest-pressure-regulating state (pressure-regulating state) when the lowest-pressure-regulating state is selected in any one of the switching control routines of FIGS. 1–13, even if the non-pressure-regulating state is selected in the other switching control routine or routines.

While the preferred embodiment of this invention have been described above in detail by reference to the drawings, for illustrative purpose only, it is to be understood that the present invention may be embodied with various changes, modifications and improvements, which may occur to those skilled in the art, in the light of the foregoing teachings.

What is claimed is:

1. A hydraulic control apparatus for controlling a vehicular automatic transmission including (a) a plurality of hydraulically operated frictional coupling devices which are selectively engaged and released to selectively establish a plurality of gear positions having respective different speed ratios, and (b) a plurality of linear solenoid valves operable to regulate fluid pressures of the respective frictional coupling devices, each of said linear solenoid valves including a spool and a solenoid, and being operable between a pressure-regulating state in which the spool is movable to a position of equilibrium of forces for regulating an output fluid pressure according to an electromagnetic force produced by said solenoid, and a non-pressure-regulating state in which the spool is held at a stroke end thereof at which no output fluid pressure is generated from the linear solenoid valve, said each linear solenoid valve placed in the pressure-regulating state being operable to regulate a fluid pressure of the corresponding frictional coupling device according to said electromagnetic force, said hydraulic control apparatus comprising:

a pressure-regulation switching portion operable to effect a determination on the basis of a present state of a vehicle provided with said automatic transmission, as to whether each non-used linear solenoid valve, which is one of said plurality of linear solenoid valves that is not presently used to engage the corresponding hydraulically operated frictional coupling device, should be placed in said pressure-regulating state or in said non-pressure-regulating state, said pressure-regulation switching portion placing said each non-used linear solenoid valve selectively in one of said pressure-regulating and non-pressure-regulating states, according to a result of said determination.

2. The hydraulic control apparatus according to claim 1, wherein said pressure-regulation switching portion includes a fluid-temperature-based switching portion operable to place said each non-used linear solenoid valve in said pressure-regulating state when a temperature of a working fluid used for operating said automatic transmission is lower than a predetermined threshold, and in said non-pressure-regulating state when said temperature is not lower than said predetermined threshold.

3. The hydraulic control apparatus according to claim 1, wherein said pressure-regulation switching portion includes a manual-shifting-based switching portion operable to place said each linear solenoid valve in said pressure-regulating state when the automatic transmission is placed in a manual shifting mode in which the automatic transmission is shiftable by an operation of a manually operable member, and in said non-pressure-regulating state when the automatic transmission is placed in an automatic shifting mode in which the automatic transmission is shifted automatically on the basis of a running condition of the vehicle and according to a predetermined shifting rule.

4. The hydraulic control apparatus according to claim 1, wherein said pressure-regulation switching portion includes a shifting-forecasting-based switching portion operable to normally place said each linear solenoid valve in said non-pressure-regulating state, and place said each non-used linear solenoid valve in said pressure-regulating state when said shifting-forecasting-based switching portion has forecast that an engaging action of said corresponding hydraulically operated frictional coupling device will take place in the near future, said shifting-forecasting-based switching portion placing said each non-used linear solenoid valve in said pressure-regulating state prior to an operation of said pressure-regulation switching portion to normally control the output fluid pressure of the non-used linear solenoid valve for effecting said engaging action of said corresponding frictional coupling device.

5. The hydraulic control apparatus according to claim 1, further comprising a shift control portion including a shifting determining portion operable to determine whether a shifting action of the automatic transmission should take place, and a shifting commanding portion operable to command at least one of said plurality of linear solenoid valves to initiate regulation of said output fluid pressure for engaging the corresponding at least one frictional coupling device to effect said shifting action of the automatic transmission, at a predetermining timing after a moment of determination by said shifting determining portion that said shifting action should take place, and wherein said pressure-regulation switching portion includes a shifting-determination-based switching portion operable to normally place said each linear solenoid valve in said non-pressure-regulating state, and place said each non-used linear solenoid valve for each of said corresponding at least one frictional coupling device in said pressure-regulating state when said shifting determining portion has determined that said shifting action should take place, said shifting-determination-based switching portion placing said each non-used linear solenoid valve in said pressure-regulating state prior to initiation of regulation of said output fluid pressure by said each non-used linear solenoid valve under the control of said shifting commanding portion.

6. The hydraulic control apparatus according to claim 1, wherein the automatic transmission has a neutral state for inhibiting power transmission therethrough, and a drive state for permitting the power transmission, and said pressure-regulation switching portion includes a neutral-state-based switching portion operable when the automatic transmission is placed in said neutral position, to place each first non-used linear solenoid valve for each of at least one of said plurality of frictional coupling devices that is to be engaged when the automatic transmission is switched from said neutral state to said drive state, in said pressure-regulating state, and place each second non-used linear solenoid valve other than said each first non-used linear solenoid valve, in said non-pressure-regulating state.

7. The hydraulic control apparatus according to claim 1, wherein said electromagnetic force "F" produced by said solenoid acts on said spool in a first direction, and said spool has a pressure-receiving surface area "Af" partially defining a feedback chamber that receives a feedback pressure "Pf" which is equal to said output fluid pressure and which acts on said spool in a second direction opposite to said first direction, said each linear solenoid valve further including a spring which biases said spool in said second direction with a biasing force "Fs", said spool being movable to a position of equilibrium of forces determined according to an equation $F = Pf \times Af + Fs$, in said pressure-regulating state.

8. The hydraulic control apparatus according to claim 1, wherein said pressure-regulating state to which said each non-used linear solenoid valve is switched by said pressure-regulation switching portion is a lowest-pressure-regulating state in which said output fluid pressure is regulated to a substantially lowest level within a range in which said spool is movable to said position of equilibrium of forces.

9. The hydraulic control apparatus according to claim 1, wherein said pressure-regulation switching portion includes a fluid-temperature-based switching portion in claim 2 operable to place said each non-used linear solenoid valve in said pressure-regulating state when a temperature of a working fluid used for operating said automatic transmission is lower than a predetermined threshold, and in said non-pressure-regulating state when said temperature is not lower than said predetermined threshold, a manual-shifting-based switching portion operable to place said each linear solenoid valve in said pressure-regulating state when the automatic transmission is placed in a manual shifting mode in which the automatic transmission is shiftable by an operation of a manually operable member, and in said non-pressure-regulating state when the automatic transmission is placed in an automatic shifting mode in which the automatic transmission is shifted automatically on the basis of a running condition of the vehicle and according to a predetermined shifting rule, a shifting-forecasting-based switching portion operable to normally place said each linear solenoid valve in said non-pressure-regulating state, and place said each non-used linear solenoid valve in said pressure-regulating state when said shifting-forecasting-based switching portion has forecast that an engaging action of said corresponding hydraulically operated frictional coupling device will take place in the near future, said shifting-forecasting-based switching portion placing said each non-used linear solenoid valve in said pressure-regulating state prior to an operation of said pressure-regulation switching portion to normally control the output fluid pressure of the non-used linear solenoid valve for effecting said engaging action of said corresponding frictional coupling device, a shifting-determination-based switching portion operable to normally place said each linear solenoid valve in said non-pressure-regulating state, and place said each non-used linear solenoid valve for each of said corresponding at least one frictional coupling device in said pressure-regulating state when said shifting determining portion has determined that said shifting action should take place, said shifting-determination-based switching portion placing said each non-used linear solenoid valve in said pressure-regulating state prior to initiation of regulation of said output fluid pressure by said each non-used linear solenoid valve under the control of said shifting commanding portion, and a neutral-state-based switching portion operable when the automatic transmission is placed in said neutral position, to place each first non-used linear solenoid valve for each of at least one of said plurality of frictional coupling devices that is to be engaged when the automatic transmission is switched from said neutral state to said drive state, in said pressure-regulating state, and place each second non-used linear solenoid valve other than said each first non-used linear solenoid valve, in said non-pressure-regulating state, said pressure-regulation switching portion placing said each non-used linear solenoid valve when any one of said fluid-temperature-based switching portion, said manual-shifting-based switching portion, said shifting-forecasting-based switching portion, said shifting-determination-based switching portion and said neutralstate-based switching portion has determined that said each non-used linear solenoid valve should be placed in said pressure-regulating state, even if any other of said fluid-temperature-based, manual-shifting-based, shifting-forecasting-based, shifting-determination-based and neutral-state-based switching portions has determined that said each non-used linear solenoid valve should be placed in said non-pressure-regulating state.

* * * * *